US010567964B2

(12) United States Patent
Tenny et al.

(10) Patent No.: US 10,567,964 B2
(45) Date of Patent: Feb. 18, 2020

(54) SECURITY FOR PROXIED DEVICES

(71) Applicant: Futurewei Technologies, Inc., Plano, TX (US)

(72) Inventors: Nathan Edward Tenny, Poway, CA (US); Hui Jin, Beijing (CN)

(73) Assignee: Futurewei Technologies, Inc., Plano, TX (US)

(*) Notice: Subject to any disclaimer, the term of this patent is extended or adjusted under 35 U.S.C. 154(b) by 68 days.

(21) Appl. No.: 15/358,345

(22) Filed: Nov. 22, 2016

(65) Prior Publication Data

US 2017/0150363 A1    May 25, 2017

Related U.S. Application Data

(60) Provisional application No. 62/259,345, filed on Nov. 24, 2015.

(51) Int. Cl.
*H04W 4/00* (2018.01)
*H04W 12/08* (2009.01)
(Continued)

(52) U.S. Cl.
CPC ............ *H04W 12/08* (2013.01); *H04L 63/18* (2013.01); *H04L 63/0281* (2013.01);
(Continued)

(58) Field of Classification Search
CPC ..... H04W 12/08; H04W 76/02; H04W 88/04; H04W 88/182; H04L 63/18; H04L 63/0281; H04L 63/0428
See application file for complete search history.

(56) References Cited

U.S. PATENT DOCUMENTS 9,095,000 B2    7/2015  Oh et al.
2006/0191002 A1*  8/2006  Lee ................... H04L 63/0428
                                                        726/13
(Continued)

FOREIGN PATENT DOCUMENTS

CN      101785272 A      7/2010
CN      102056157        5/2011
(Continued)

OTHER PUBLICATIONS

"International Application No. PCT/CN2016/106964, International Search Report and Written Opinion dated Mar. 7, 2017", (Mar. 7, 2017), 12 pgs.
(Continued)

*Primary Examiner* — Barry W Taylor
(74) *Attorney, Agent, or Firm* — Schwegman Lundberg & Woessner, P.A.

(57) ABSTRACT

A method includes establishing, by a mobile device in a wireless network, an indirect connection of a first device to a node of the wireless network using the mobile device as an intermediate node for wireless transport and transferring, by the mobile device, data over the indirect connection via a first wireless link comprising a direct device connection between the first device and the mobile device and a second wireless link comprising a direct 3GPP (3rd Generation Partnership Project) connection between the mobile device and the wireless network. The indirect connection supports security protection of communications between the node of the wireless network and the first device based at least in part on an active security context maintained within the wireless network for communication via at least one messaging protocol layer with at least the first device.

20 Claims, 13 Drawing Sheets

(51) Int. Cl.
  *H04L 29/06* (2006.01)
  *H04W 88/18* (2009.01)
  *H04W 88/04* (2009.01)
(52) U.S. Cl.
  CPC ......... *H04L 63/0428* (2013.01); *H04W 88/04* (2013.01); *H04W 88/182* (2013.01)

(56) References Cited

U.S. PATENT DOCUMENTS

| | | | |
|---|---|---|---|
| 2008/0120728 A1* | 5/2008 | Jiang | H04W 12/10 726/30 |
| 2009/0075628 A1* | 3/2009 | Patwardhan | H04W 12/04 455/410 |
| 2010/0260129 A1* | 10/2010 | Ulupinar | H04L 12/4633 370/329 |
| 2011/0044249 A1* | 2/2011 | Wu | H04W 76/11 370/328 |
| 2012/0213139 A1* | 8/2012 | Zee | H04W 72/1257 370/311 |
| 2012/0264375 A1 | 10/2012 | Shankaranarayanan | |
| 2013/0294327 A1* | 11/2013 | Horn | H04W 88/04 370/315 |
| 2014/0106707 A1 | 4/2014 | Bontu et al. | |
| 2016/0156404 A1* | 6/2016 | Wolfner | H04W 76/14 370/315 |
| 2016/0286600 A1* | 9/2016 | Faccin | H04L 63/10 |
| 2016/0350458 A1* | 12/2016 | Hively | H04B 13/02 |
| 2016/0353511 A1* | 12/2016 | Gunnarsson | H04W 76/028 |
| 2017/0094597 A1* | 3/2017 | Su | H04W 12/04 |

FOREIGN PATENT DOCUMENTS

| | | |
|---|---|---|
| CN | 103297961 | 9/2013 |
| JP | 2010537576 A | 12/2010 |
| JP | 2015070571 A | 4/2015 |
| JP | 2015185960 A | 10/2015 |
| WO | WO-2013010010 A1 | 7/2012 |
| WO | WO-2014061180 A1 | 4/2014 |
| WO | WO-2015125479 A1 | 8/2015 |

OTHER PUBLICATIONS

"3GPP TR 22.891 V1.1.0 (Nov. 2015)", 3rd Generation Partnership Project; Technical Specification Group Services and System Aspects; Feasibility Study on New Services and Markets Technology Enablers; Stage 1 (Release 14), (2015), 95 pgs.

"3GPP TR 23.703 V2.0.0 (Feb. 2014)", 3rd Generation Partnership Project; Technical Specification Group Services and System Aspects; Study on architecture enhancements to support Proximity-based Services (ProSe) (Release 12), (2014), 327 pgs.

"3GPP TR 23.703 V2.0.0 (Feb. 2014)", 3rd Generation Partnership Project; Technical Specification Group Services and System Aspects; Study on architecture enhancements to support Proximity-based Services (ProSe) (Release 12), (2014), 324 pgs.

"3GPP TS 23.303 V13.1.1 (Sep. 2015)", 3rd Generation Partnership Project; Technical Specification Group Services and System Aspects; Proximity-based services (ProSe); Stage 2 (Release 13), (2015), 116 pgs.

"3GPP TS 33.401 V12.15.0 (Sep. 2015)", 3rd Generation Partnership Project; Technical Specification Group Services and System Aspects; 3GPP System Architecture Evolution (SAE); Security architecture (Release 12), (2015), 131 pgs.

"3GPP TS 36.300 V13.1.0 (Sep. 2015)", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), (2015), 254 pgs.

Raghothaman, Balaji, et al., "System Architecture for a Cellular Network with UE Relays for Capacity and Coverage Enhancement", White Paper, published by InterDigital Communications, (2012), 6 pgs.

"European Application Serial No. 16867994.2, Supplemental European Search Report dated Jun. 12, 2018", 9 pgs.

Huawei, et al., "Potential requirements of Smart Wearable (PAN) family in MIoT TR", TR3GPP TSG-SA WG1 Meeting #72, S1-154279, (Nov. 16-20, 2015), 2 pgs.

"Japanese Application No. 2018-511711, Notice of Reasons for Rejection dated Apr. 9, 2019", (Apr. 9, 2019), 5 pgs.

"Chinese Application No. 201680068146.7, First Office Action dated Nov. 28, 2019", (Nov. 28, 2019), 6 pgs.

"Japanese Application No. 2018-511711, Notice of Reasons for Refusal dated Dec. 17, 2019, "(Dec. 17, 2019), 5 pgs.

* cited by examiner

SECURITY FOR PROXIED DEVICES

CROSS-REFERENCE TO RELATED APPLICATION

This application claims priority to U.S. Provisional Application Ser. No. 62/259,345 (SECURITY FOR PROXIED DEVICES, filed Nov. 24, 2015) which is incorporated herein by reference.

TECHNICAL FIELD

The present disclosure is related to proxied devices, and in particular to security mechanisms for proxied devices.

BACKGROUND

Wearable devices (WD) are using cell phones or other cellular enabled devices such as tablets and laptop computers, commonly referred to as user equipment (UE) as a relay to a cellular network. In a wireless environment with many battery-limited devices, such as wearables and many machine type communications/Internet of things (MTC/IoT) devices, scaling of conventional wireless service quickly becomes a problem. This issue is begun to be addressed with the paradigm of a "relay UE", i.e., a less battery-limited UE such as a conventional smartphone that can relay communications between one or more devices and the network. The relay UE (R-UE) acts as a communications proxy for the other devices, allowing them to disable their power-intensive wireless wide area network (WWAN) connections and operate on a low-power, short-range link with the R-UE. This scenario may be described as an "indirect path" connection to the network, in contrast to the "direct path" of an over-the-air WWAN connection to a base station.

SUMMARY

A method includes supporting an indirect connection of a first device [WD] to a node of a wireless network using a second device [UE] as an intermediate node for wireless transport, using a first wireless link between the first device and the second device and a second wireless link between the second device and the wireless network to manage the indirect connection, wherein the indirect connection supports security protection of communications with the first device based at least in part on an active security context maintained within the wireless network for communication via at least one messaging protocol layer with at least the first device, and wherein a security association for the at least one messaging protocol layer is between the first device and the wireless network, such that a message is protected by access stratum (AS) security as the message is routed through the second device.

A cellular communication device includes at least one transceiver configured to receive and transmit cellular communications with a base station. The at least one transceiver is further configured to receive and transmit signals with a remote device via a lower power communication link. A routing entity is coupled to the at least one transceiver to route communications intended for the device and the remote device. A proxy entity is coupled to the routing entity. The proxy entity provides secure communications with the remote device via at least one messaging protocol layer such that the cellular communication device operates as a secure relay between the remote device and the base station, multiplexing radio resource control (RRC) messages for both the cellular communication device and the remote device over a single wireless RRC connection to the base station. A security entity may be used in correspondence with a security context maintained in a node of the wireless network in some embodiments.

A base station includes a non-transitory memory storage comprising instructions and one or more processors in communication with the memory. The one or more processors execute the instructions to establish a user equipment (UE) radio resource control (RRC) connection to a UE, access security portions of a UE context and a remote device context, each context comprising separate access stratum (AS), and perform encryption operations using separate encryption keys for the UE and the remote device such that communications for the UE are encrypted using a UE key and communications for the remote device are encrypted using a remote device key. The remote device and the base station share the remote device key to protect communications for the remote device. Communications between the base station and the remote device are sent and received over the UE RRC connection to the UE.

Various examples are now described to introduce a selection of concepts in a simplified form that are further described below in the detailed description. The Summary is not intended to identify key or essential features of the claimed subject matter, nor is it intended to be used to limit the scope of the claimed subject matter.

In example 1, a method includes establishing, by a mobile device in a wireless network, an indirect connection of a first device to a node of the wireless network using the mobile device as an intermediate node for wireless transport and transferring, by the mobile device, data over the indirect connection via a first wireless link comprising a direct device connection between the first device and the mobile device and a second wireless link comprising a direct 3GPP (3rd Generation Partnership Project) connection between the mobile device and the wireless network. The indirect connection supports security protection of communications between the node of the wireless network and the first device based at least in part on an active security context maintained within the wireless network for communication via at least one messaging protocol layer with at least the first device, wherein a security association for the at least one messaging protocol layer is between the first device and the wireless network, such that signaling and data traffic through the mobile device are protected, and wherein the first device and a node of the wireless network share at least one security key usable to protect data for the first device.

Example 2 includes the method of example 1, wherein data protected with the at least one security key is delivered by the mobile device between the first device and the wireless network without being removed by the mobile device from a protected condition.

Example 3 includes the method of any of examples 1-2, wherein the security association comprises security protection of an access stratum (AS) protocol layer, and wherein the mobile device operates as a proxy protocol entity comprising a proxy AS entity.

Example 4 includes the method of example 3, wherein the proxy AS entity communicates with an AS entity in the first device and wherein the AS protocol layer is a radio resource control (RRC) protocol layer.

Example 5 includes the method of example 4 and further comprising multiplexing RRC messages for both the first device and the mobile device over a single wireless RRC connection between the mobile device and the node of the wireless network.

Example 6 includes the method of any one of examples 4-5, wherein the proxy AS entity maintains an identifier corresponding to the first device, wherein the identifier is a cell radio network temporary identifier (C-RNTI), and wherein the security association is established based at least in part on a first security context maintained within the wireless network for the first device.

Example 7 includes the method of any one of examples 4-6, wherein the mobile device receives AS protocol messages for the first device and for the mobile device on a common signaling radio bearer from the wireless network, wherein the mobile device selectively delivers to the first device the AS protocol messages for the first device, and wherein the mobile device identifies the AS protocol messages for the first device by a process of demultiplexing.

Example 8 includes the method of example 7, wherein the process of demultiplexing includes applying a first security-related procedure for the mobile device to a received AS message, detecting a failure in the first security-related procedure, applying a second security-related procedure for the first device to a received AS message, and detecting a success in the second security-related procedure.

Example 9 includes the method of example 8, wherein the at least one security key is associated by the node of the wireless network with a data radio bearer for the first device and wherein the data radio bearer for the first device is associated with a network bearer identified in the node of the wireless network based at least in part on a tunnel endpoint identifier (TEID).

Example 10 includes the method of any one of examples 9-10, wherein the node of the wireless network maintains a cryptosync value associated with the first device and updates the cryptosync value to reflect a security operation using at least one security key, wherein the node of the wireless network updates the cryptosync value when it performs an encryption operation using the at least one security key, wherein the node of the wireless network updates the cryptosync value when it performs a decryption operation using the at least one security key, and wherein the node of the wireless network updates the cryptosync value when it succeeds in performing an integrity operation using the at least one security key.

Example 11 includes the method of example 10, wherein the key derivation operation is triggered by a protocol message received from the mobile device.

Example 12 includes the method of any one of examples 9-11, wherein the second device forwards to the node of the wireless network a message of the AS protocol layer received from the first device, without applying a security operation to the message.

In example 13, a cellular communication device includes at least one transceiver configured to receive and transmit cellular communications with a base station, the at least one transceiver is further configured to receive and transmit signals with a remote device via a lower power communication link, a routing entity coupled to the at least one transceiver to route communications intended for the cellular communication device and the remote device, and a proxy entity coupled to the routing entity, the proxy entity providing secure communications with the remote device via at least one messaging protocol layer such that the cellular communication device operates as a secure relay between the remote device and the base station, multiplexing radio resource control (RRC) messages for both the cellular communication device and the remote device over a single wireless RRC connection to the base station, and wherein the remote device and the base station share at least one security key usable to protect data for the remote device, and wherein data protected with the at least one security key is delivered by the cellular communication device between the remote device and the base station. In one embodiment, such communication is not removed by the cellular communication device from a protected condition.

Example 14 includes the device of example 13, wherein the first transceiver communicates with the base station over at least one logical bearer that is associated with a tunnel endpoint ID (TEID) assigned for communication with at least the remote device.

Example 15 includes the device of example 14, wherein the routing entity identifies data directed from the base station to the remote device based at least in part on interpreting the TEID as a distinguishing identifier.

Example 16 includes the device of any one of examples 14-15, wherein the routing entity directs data from the remote device to the base station based at least in part on sending the TEID as a distinguishing identifier. The at least one transceiver may include first and second transceivers which may be formed as an integrated transceiver.

Example 17 includes the device of example 13, wherein secure communications are secured by security protection of an AS protocol layer, and wherein the proxy entity comprises a proxy AS entity.

Example 18 includes the device of example 17, wherein the proxy AS entity communicates with an AS entity in the remote device.

Example 19 includes the device of any one of examples 17-18, wherein the AS protocol layer is a radio resource control (RRC) protocol layer.

Example 20 includes the device of any one of examples 18-20, wherein the proxy AS entity maintains an identifier corresponding to the remote device.

Example 21 includes the device of example 20, wherein the identifier is a cell radio network temporary identifier (C-RNTI).

Example 22 includes the device of any one of examples 17-21, wherein the secure communications are established based at least in part on a first security context maintained within the base station for the remote device.

Example 23 includes the device of any one of examples 17-22, wherein the first transceiver receives AS protocol messages for the remote device and for the device on a common signaling radio bearer from the base station.

Example 24 includes the device of example 23, wherein the second transceiver selectively delivers to the remote device the AS protocol messages for the remote device.

Example 25 includes the device of any one of examples 23-24, wherein the routing entity identifies the AS protocol messages for the remote device by a process of demultiplexing.

In example 26, a device includes a non-transitory memory storage comprising instructions and one or more processors in communication with the memory. The one or more processors execute the instructions to support an indirect connection of a first device to a node of a wireless network using a second device as an intermediate node for wireless transport and use a first wireless link between the first device and the second device and a second wireless link between the second device and the wireless network to manage the indirect connection. The indirect connection supports security protection of communications with the first device based at least in part on an active security context maintained within the wireless network for communication via at least one messaging protocol layer with at least the first device. A security association for the at least one messaging protocol layer is between the first device and the wireless network, such that a message is protected by access stratum (AS) security as the message is routed through the second device.

Example 27 includes the device of example 26 wherein the first device and a node of the wireless network share at least one security key usable to protect data for the first device, and wherein data protected with the at least one security key are delivered by the second device between the first device and the wireless network without being removed by the second device from a protected condition.

Example 28 includes the device of any one of examples 26-27 wherein the at least one security key is associated by the node of the wireless network with a data radio bearer for the first device and wherein the bearer for the first device is a network bearer identified in the node of the wireless network based at least in part on a tunnel endpoint identifier (TEID).

In example 29, a base station includes a non-transitory memory storage comprising instructions and one or more processors in communication with the memory. The one or more processors execute the instructions to establish a user equipment (UE) radio resource control (RRC) connection to a UE, access security portions of a UE context and a remote device context, each context comprising separate access stratum (AS), perform encryption operations using separate encryption keys for the UE and the remote device such that communications for the UE are encrypted using a UE key and communications for the remote device are encrypted using a remote device key, and wherein the remote device and the base station share the remote device key to protect communications for the remote device, and wherein communications between the base station and the remote device are sent and received over the UE RRC connection to the UE without being unencrypted by the UE.

Example 30 includes the base station of example 29 wherein the UE context and remote device context further maintain non-access stratum (NAS) security respectively for the UE and remote device.

Example 31 includes the base station of example 29 wherein the UE and base station share at least one security key usable to protect data for the remote device, and wherein data protected with the at least one security key are delivered by the UE between the remote device and the base station without being removed by the UE from a protected condition.

Example 32 includes the base station of example 29 wherein the at least one security key is associated by the base station with a data radio bearer for the remote device and wherein the bearer for the remote device is associated with a network bearer identified in the base station based at least in part on a tunnel endpoint identifier (TEID).

DETAILED DESCRIPTION

Figure 1:
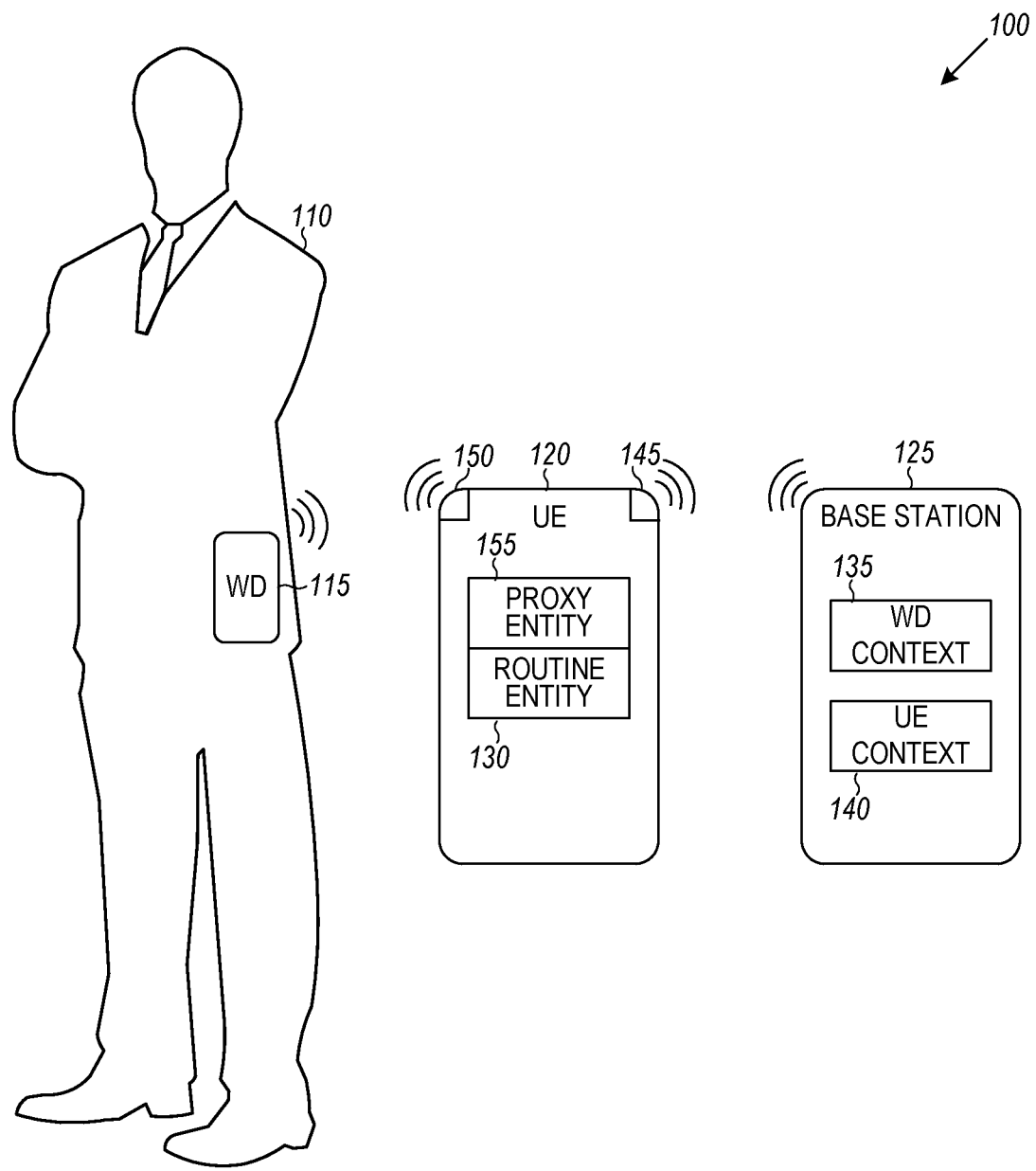
FIG. 1 is a block diagram illustrating one example relaying architecture using a "proxy RRC" approach according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage devices such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, application specific integrated circuit (ASIC), microprocessor, or other type of processor operating on a computer system, such as a personal computer, server or other computer system.

When wearable or machine type communication (MTC) devices are served by proxy through a relay UE (R-UE), security reaching to the endpoint device is provided by at least one of several methods described in this application. Prior methods of using a relay UE have not adequately addressed security of the communications between the devices. A family of protocol architectures for meeting such a security requirement in a long term evolution (LTE)-like network architecture is described. The members of the family are similar in concept, but involve the use of proxy protocol entities in different layers of the R-UE, with corresponding differences in security procedures.

An architecture for UE relaying, including security aspects, is adaptable to a variety of technologies to support the direct link between the remote device, which may be a local device such as a wearable device (WD) or other device near enough to the R-UE for relaying communications, and the R-UE. The remote device will be referred to as WD throughout for convenience with the understanding that the remote device need not be wearable. Especially with wearables, personal area network (PAN) technologies such as Bluetooth offer an attractive incumbent technology for this purpose. Accordingly, the subject matter of the present application strives to minimize assumptions about the protocol stack of the WD, confining those assumptions to the functionality used to establish the relaying relationship while benefiting from a robust 3GPP ($3^{rd}$ generation partnership project) security architecture.

Three versions or cases of a solution follow as illustrated by various examples, using different protocol layers and proxying arrangements.

"UE-only" security version: No active context for the WD, and all security handled by the UE.

"Proxy NAS (non-access stratum)" version: The WD has a NAS entity but no RRC (radio resource control) entity; NAS security end-to-end from WD to MME (mobility management entity).

"Proxy RRC" version: The WD has NAS and RRC entities and considers itself RRC connected; the UE and the WD have separate security contexts with the eNB (evolved universal mobile telecommunication system terrestrial radio access network node B, also referred to as E-UTRAN NodeB). eNB refers to evolved node B in the LTE standard. It may also be referred to as a base station that connects a cellular network to UE. Each WD has its own DRB (data radio bearer), for which the UE is a PDCP (packet data convergence protocol (3GPP)) relay.

FIG. 1 is a block diagram illustrating one example relaying architecture referred to as a proxy RRC version generally at 100. A person 110 is shown wearing a wearable, or remote device 115. In various embodiments, the remote device 115 may be a battery powered, or otherwise power constrained device that may be worn by a user. In further embodiments, the remote device 115 may be simply located proximate a less power constrained cellular communication device 120, such as a UE. Devices 115 and 120 may communicate with each other wirelessly via a PAN, operating at low power to conserve battery life of remote device 115. The cellular communication device 120 may communicate wirelessly with a base station 125, such as an eNB. Cellular communication device 120 may contain a routing entity 130 that manages communications securely between remote device 115 and cellular communication device 120. The routing entity 130 also multiplexes communications with the base station 125, which has a remote device 110 context indicated as WD CONTEXT at 135, and a cellular communication device 120 context indicated as UE CONTEXT 140.

In one embodiment, device 120 is a cellular communication device that includes a first transceiver 145 configured to receive and transmit cellular communications with the base station. A second transceiver 150 is configured to receive and transmit signals with the remote device 115 via a lower power communication link. In some embodiments, the first and second transceivers may be integrated together as a single transceiver capable of processing signals via one or more protocols. The routing entity 130 is coupled to the first transceiver 145 and the second transceiver 150 to route communications intended for the cellular communication device 120 and the remote device 115. A proxy entity 155 is coupled to the routing entity 130. The proxy entity 135 provides secure communications with the remote device 115 via at least one messaging protocol layer such that the cellular communication device 120 operates as a secure relay between the remote device 115 and the base station 125. In one embodiment, the cellular communication device 125 multiplexes radio resource control (RRC) messages for both the cellular communication device 120 and the remote device 115 over a single wireless RRC connection to the base station 125.

Figure 2:
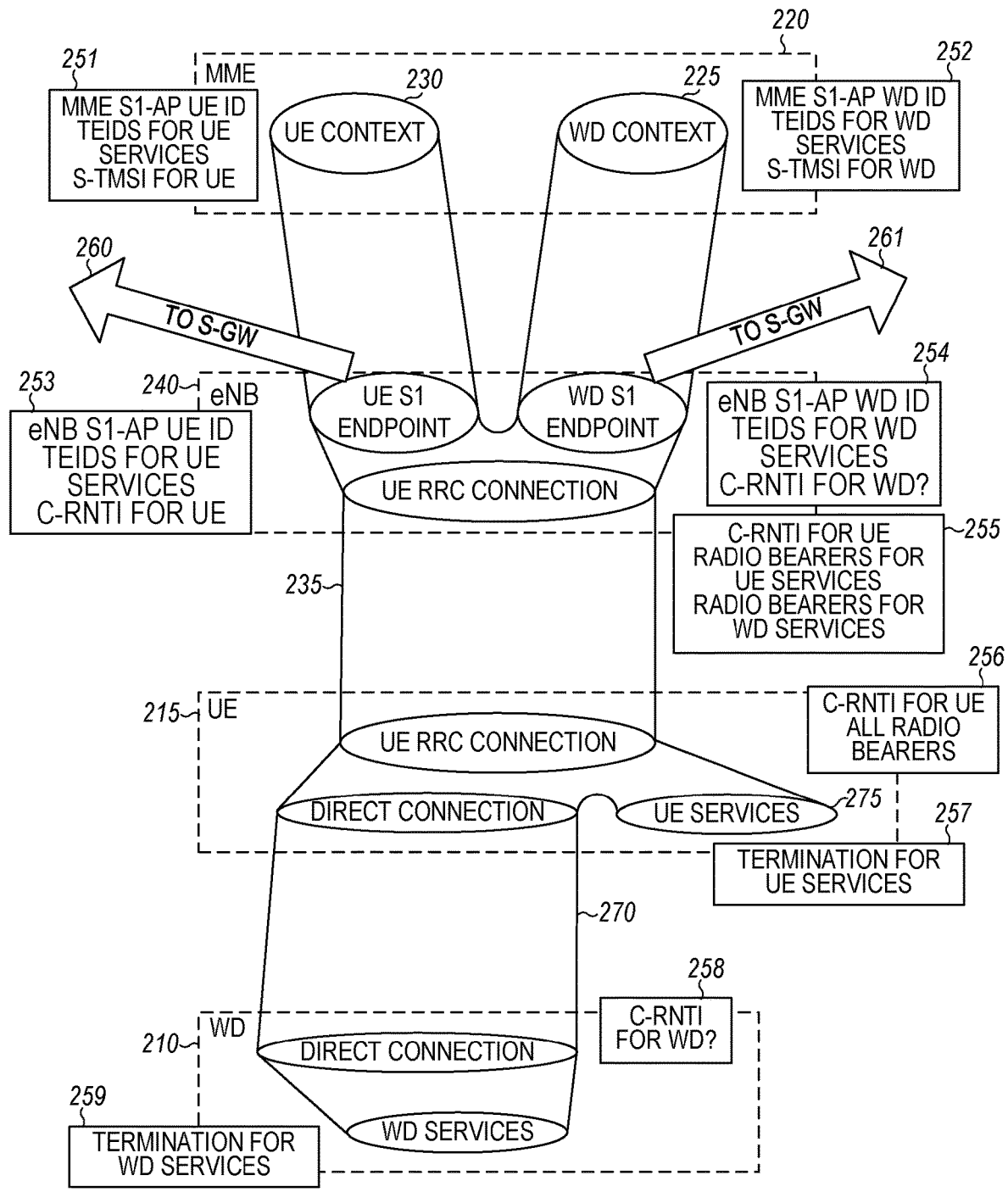
FIG. 2 is a block diagram of a system illustrating bearers and contexts for indirect path connection of a remote device through another device according to an example embodiment.

FIG. 2 is a block diagram of a system 200 illustrating bearers (distinct connections) and contexts for indirect path connection of a remote device, indicated as wearable device (WD) 210 through another device, such as a UE 215. FIG. 2 is applicable to at least the proxy NAS and proxy RRC versions. Assume throughout that a mobility management entity (MME) 220 has separate contexts 225 and 230 for WD 210 and UE 215. In one embodiment, MME 220 is a control-node for an LTE access-network. MME 220 may be involved in a bearer activation/deactivation process and is also responsible for choosing a serving gateway (SGW) for a UE at the initial attach. The Non Access Stratum (NAS) signaling terminates at the MME 220 and MME 220 is also responsible for generation and allocation of temporary identities to UEs. MME 220 checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME 220. The MME 220 also provides the control plane function for mobility between LTE and 2G/3G access networks.

An evolved universal mobile telecommunications system terrestrial radio access network (eNB) 240 has context information for both the UE and the WD, associated with a single RRC connection 235 for the UE 215. For clarity, this description assumes that the WD and UE contexts 225 and 230 are in the same MME 220. Text in the rectangular boxes 250, 251, 252, 253, 254, 255, 256, 257, 258, and 259 indicates information maintained at each of the various levels indicated by broken lines. Arrows 260 and 261 indicate communications flow to a serving gateway (S-GW). The WD 210 is shown as the endpoint, but any other proxied device may be an endpoint.

The UE 215 maintains a direct connection 270 to the WD 210, so the UE 215 knows which data received from the WD 210 is associated with the WD 210 and maintains encryption between the UE and WD. Connection 270 is also shown connected to UE services 275 for handing communications intended for the UE 215. The proxy entity 155 (FIG. 1) is created in the protocol stack such that traffic to and from the WD 210 is handled by the proxy. The question of whether the WD 210 has its own cell radio network temporary identifier (C-RNTI) will be addressed below with respect to the proxy RRC version.

The WD and UE each maintain security in RRC (UE-eNB), non-access stratum (NAS) (UE-MME), and user plane (UE-SGW). The keys and security state information are maintained in the respective contexts in the MME (along with derived keys that are transferred to other locations, e.g., $K_{eNB}$ in the eNB). Throughout, it is assumed that the "direct link" between WD and UE has its own security provisions.

Figure 3:
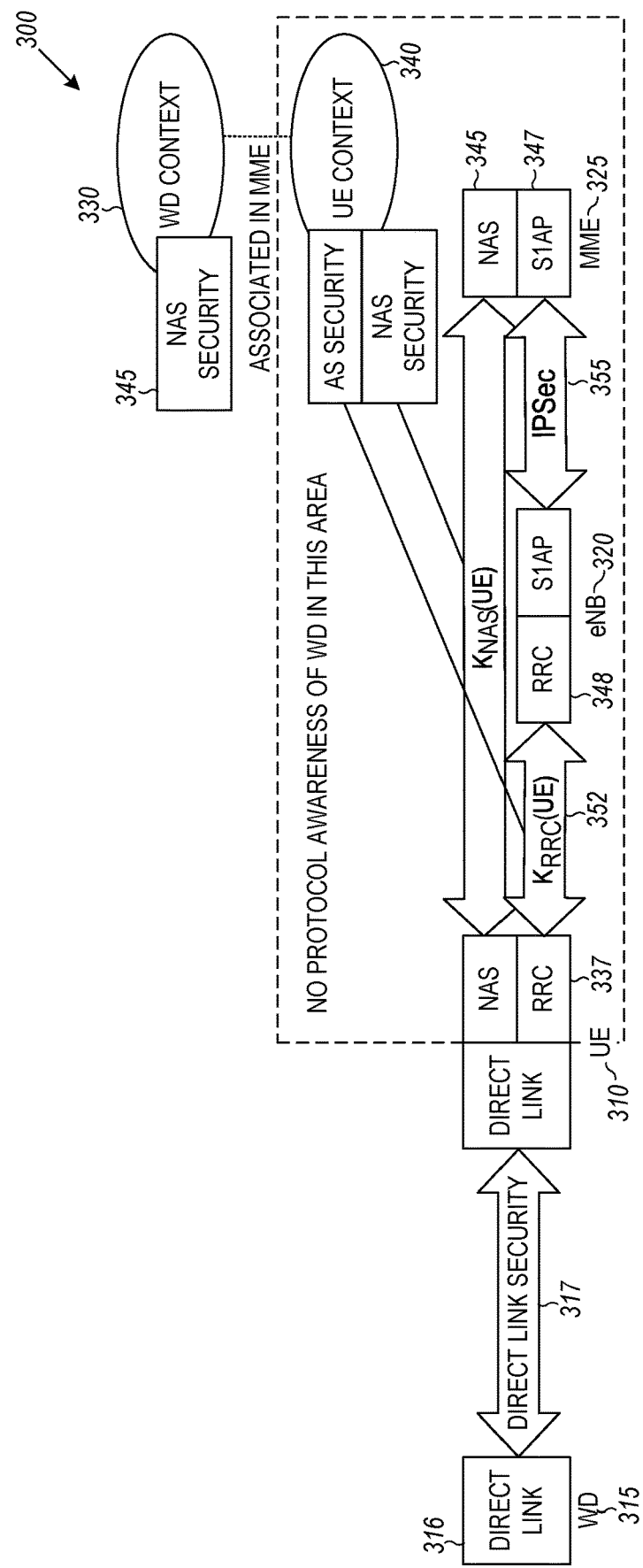
FIG. 3 is a block diagram illustrating control plane stacks of a system for UE only security according to an example embodiment.

FIG. 3 is a block diagram illustrating control plane stacks of a system 300 for version 1, UE only security. In UE-only security, the UE 310 handles all security for the WD 315, and the WD 315 has no RRC connection and no keys of its own. A direct link 316 is established to UE 310 with direct link security 317. In this case the WD 315 simply appears to the network as a bearer of the UE 310, that is, a particular tunnel endpoint ID (TEID) for an evolved packet system (EPS) bearer termination point in the eNB 320 associated with a radio bearer for the UE 310. The MME 325 has a separate context 330 for the WD 315, but it needs to know that certain functions including security are proxied to the UE 310.

Switching between the direct and indirect path includes activating and deactivating the security portions of the WD context 330 in the MME 325. When on the indirect path, the WD 315 is not RRC connected, so it has no access stratum (AS) security context; but it remains in a NAS state of EMM-REGISTERED and has a NAS security context. The NAS security context is not actually being used, because the NAS protocol stack 335 terminates at the UE 310. Thus, the UE 310 has both NAS 335 and RRC 337 in its protocol stack, A UE context 340 has both an AS security 342 stack and NAS security 343 stack. MME has a NAS security 345 stack and an S1-AP at 347. eNB 320 also has an RRC 348 stack.

There is no reason here for the eNB 320 to have any context for the WD 315; it has only a particular enhanced-radio access bearer (E-RAB) (or more than one, in case of multiple data streams from the WD 315), terminated in the normal way between the MME 325 and the UE 310, that happens to carry the WD's service. (The S1 bearer for this E-RAB could be associated with either the UE's or the WD's MME S1-AP (signaling interface-application protocol) UE ID (identifier), depending on separate architectural decisions, but should always have the UE's eNB S1-AP UE ID as indicated at 350.) The corresponding user-plane bearer is an EPS bearer that "belongs" to the UE 310, with a tunneling endpoint identifier (TEID) that the UE 310 knows to associate with the proxy service it offers the WD 315. In effect, the UE 310 is acting as an IP relay in general, though depending on the protocol architecture used for the direct link, it could be relaying at lower layers (e.g., if the PC5 interface is used for the direct link, and the UE 310 is seen by the WD 310 as an eNB, it functions as a layer 2 relay). Security is provided by the wireless wide area network (WWAN) only up to the relay point.

Note that in the user plane, the case 1, UE only security, data security terminates in the PDCP entity at the UE, so the UE has cleartext access to the WD's user data. Such access may be acceptable for situations where a UE only connects to devices that are owned and controlled by the same user, and/or where data security for the WD is maintained over-the-top at the service level. Note that various keys are used for secure communications. An RRC key 352, $K_{RRC}(UE)$ is used between RRC 337 of UE 310 and RRC 348 of eNB 320. A NAS key 354 $K_{NAS}(UE)$ is used between NAS 335 of UE 310 and NAS 345 of MME 347. IP security 355 is also shown between S1AP resource 350 of eNB 320 and S1AP resource 347 of MME 325.

There is no impact to the eNode B 320 in the UE-only security version, but the MME 325 takes some internal actions to manage various operations towards the context of the UE 310 when they would normally affect the context of the WD 315 (for instance, an incoming page for the WD 315 would be re-routed to the UE 310). Thus the MME 325 is involved in any switch between the direct and indirect paths, at least to activate/deactivate the WD's NAS security context 345; furthermore, as seen below, it is practically necessary to allow it to invoke certain procedures that result either in temporary reactivation of the security context or in a forced switch to a direct path.

To the core network, the PDN (public data network) connection that handles the WD's data is seen as belonging to the UE 310, with no associated information about the proxied device(s), and as a consequence, authorization, charging, and any related functions cannot be performed at the granularity of the WD 315 without some impact to existing NAS procedures and bearer handling. At a minimum, the admission of the WD 315 involves an authentication procedure towards its home public land mobile network (PLMN); if admission through the indirect path is to be supported, or if the network wants to invoke any security procedures such as re-authentication towards the WD 315, a minimal protocol layer is allowed to "tunnel" through the direct link, and is capable of triggering either basic security functions (using a subset of the existing NAS protocol) or a forced switch to the indirect path (effectively a new NAS function applicable only to proxied devices).

This "partial NAS" protocol could be provided as part of the direct link interface (e.g. as a control message on the PC5 interface used for ProSe/D2D (device to device) in LTE). However, for adaptability to different radio technologies, it would be preferable to define it over the top between the UE 310 and the WD 315.

Figure 4:
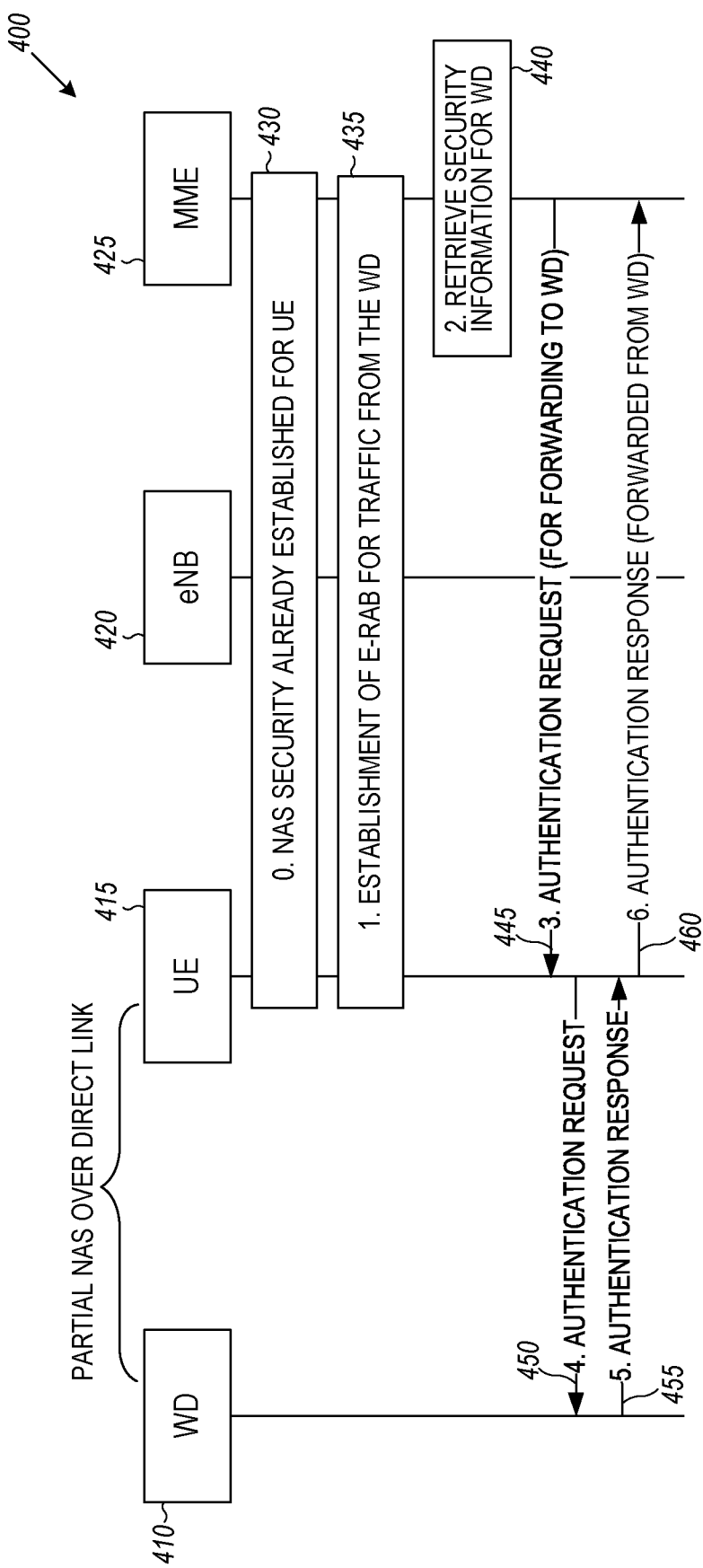
FIG. 4 is a block timing diagram showing message forwarding over a partial NAS security protocol according to an example embodiment.

One approach to carrying out authentication through such a protocol for the UE-only version or case, by using a limited NAS relay functionality in the UE, is shown at 400 in FIG. 4 which shows message forwarding over a partial NAS protocol. A WD 410, UE 415, eNB 420 and MME 425 are shown at the top, with events, including messages illustrated beneath in a time sequence. At 430, NAS security is already established for the UE 415.

At 435, E-RAB for traffic from WD 410 is established, and security information for the WD 410 is retrieved at 440. The NAS messaging formats between the UE and MME are slightly affected to support this "partial proxy" behavior, since the UE's NAS entity needs to be able to recognize the authentication request at 455 as being intended for forwarding to the WD 410 rather than for processing internally. At 450, the UE 415 forwards the authentication request to the WD 410, which provides an authentication response at 455. The UE then forwards the authentication response from the WD to the MME at 460, completing set up of security for the UE only security version, case 1.

The MME 425 already is aware of the distinguished nature of the concerned E-RAB (to associate it with the WD's context internally), so it can trigger the authentication procedure at the establishment at 435, and it can avoid sending a subsequent SECURITY MODE COMMAND, since this authentication procedure is only for admission control and to establish the UE's legitimacy in forwarding traffic for the concerned WD 410. Thus the partial-NAS implementation does not need to support additional security messages.

Figure 5:
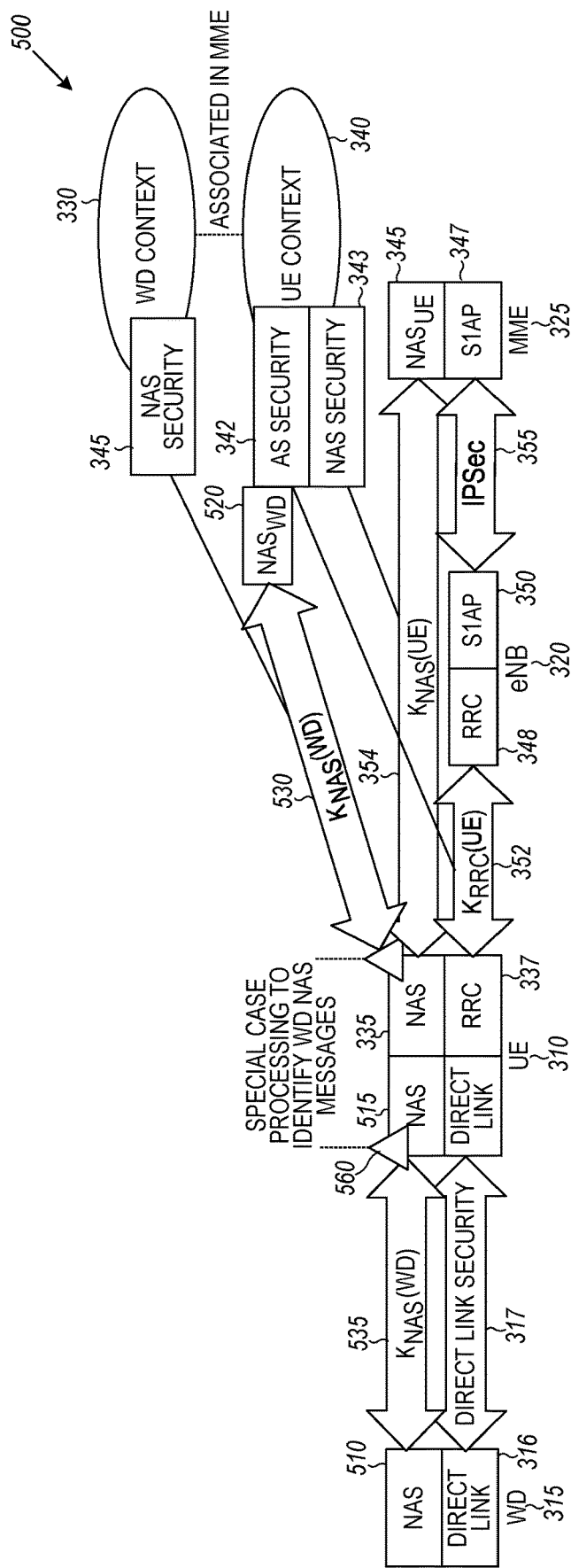
FIG. 5 is a block diagram illustrating control plane stacks of a system for proxy NAS security according to an example embodiment.

In the proxy NAS version, case 2, the UE handles RRC security for the WD, but NAS is carried across the direct link and NAS security is end-to-end between the WD and its context in the MME as illustrated generally at 500 in FIG. 5, illustrating control plane protocol stacks, where the reference numbers of like elements is consistent with the reference numbers in FIG. 3.

The bearer situation is the same as in FIG. 3, corresponding to UE only security. The WD 315 is represented in the radio layer by a particular bearer on the UE's RRC connection. However, the UE will receive certain downlink NAS messages that are destined for the WD; it can distinguish them with either of two methods (Option 1/Option 2 below), and they need to be passed on through the "proxy NAS" layer on the direct link. The proxy NAS layer includes NAS stack 510 in WD 315, NAS stack 515 in UE 310 and NAS stack 520 in MME 325. An NAS key, $K_{NAS}$(WD) is passed at 530 and 535 to provide for encryption between the MME and WD.

Notice that FIG. 5 assumes that an S1 context is already established for the WD 315, so that NAS messages can be routed correctly once they are identified—the establishment of S1 resources 350 and 347 between the eNB 320 and MME 325 for this purpose could be triggered in various ways.

The protocol model of FIG. 5 has NAS without RRC in the WD (unless the direct link itself provides an RRC entity). The NAS keys are managed based on the respective values of a key, $K_{ASME}$, from the UE and WD contexts in the MME. NAS COUNT values are maintained independently.

The largest complication seems to be the receiver-side handling of WD NAS messages in the UE (downlink) and the MME (uplink). In the downlink direction, all NAS messages will arrive indiscriminately on SRB2 (signaling radio bearer 2), and the UE must demultiplex them correctly while maintaining its own NAS state information independent of the WD's NAS messages.

In the uplink direction, the eNB has the ability to route S1 signaling separately to the UE or the WD, by choosing the appropriate S1 bearer (that is, using respectively the eNB S1-AP UE ID or the eNB S1-AP WD ID as the source of the S1 message); however, it cannot distinguish which NAS messages belong to which device. Either an extra indicator in the NAS container messages like ULInformationTransfer is needed, or the eNB will route all NAS signaling to the UE's context in the MME.

For both directions, the receiver (UE in the downlink direction, eNB in the uplink direction) needs some procedure or special case processing 560 to distinguish UE NAS and WD NAS messages. One approach would be to modify the NAS-container messages in RRC (or add a new special-purpose container message) to allow the sender (eNB or UE depending on direction) to indicate explicitly when a NAS message belongs to the WD. A second approach uses a "check-and-fail" mechanism to determine based on the security information.

Option 1 for proxy NAS: Extra IE (information element—used to describe protocol messages) in NAS container messages.

This approach to routing NAS messages is conceptually simple: When the UE sends a proxied NAS message for the WD in the uplink direction (respectively: the eNB in the downlink direction), it includes in the containing RRC message an identifier for the WD. The receiving eNB (resp. UE) detects this identifier and delivers the NAS PDU (protocol data unit) to the appropriate entity (S1 bearer/direct link).

This option is transparent to the MME so far as message routing is concerned, confining impact to the RRC layer. However, it has a broad impact on the air interface, in that multiple RRC messages (anything with the potential to contain a NAS PDU) must be modified to support this highly specific feature.

Figure 6:
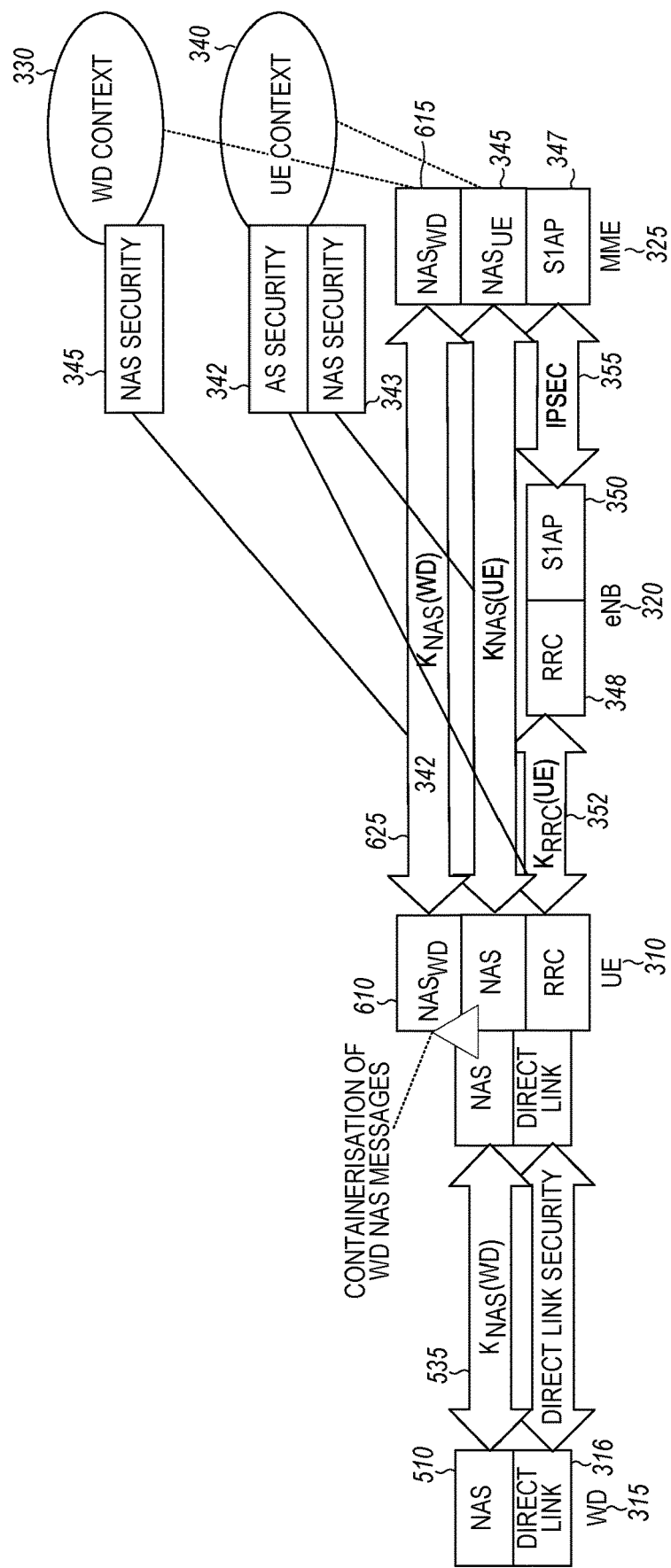
FIG. 6 is a block flow of a NAS in NAS control plane routing with differently distributed impact in a "NAS-in-NAS" protocol model according to an example embodiment.

FIG. 6 is a block flow diagram of an NAS in NAS control plane routing diagram 600 where reference numbers of similar elements are the same as in FIGS. 3 and 5. FIG. 6 illustrates a variation with differently distributed impact in an "NAS-in-NAS" protocol model, using a secondary NAS entity between the UE and MME at 610 and 615 respectively, with its traffic carried in a new container message of the NAS layer as indicated at a containerization of WD NAS messages block 620. In this case an NAS message for the WD would pass through both contexts in the MME, requiring double encryption/decryption via $K_{NAS}$(WD) at 625, but not requiring separate S1-AP resources for the WD's NAS messaging.

The routing 600 is transparent to the eNB, but requires special handling at the UE and MME to recognize the new container message and deliver its contents accordingly.

Check-and-fail routing of NAS messages is a second option for NAS message routing in the proxy NAS version, case 2.

Figure 7:
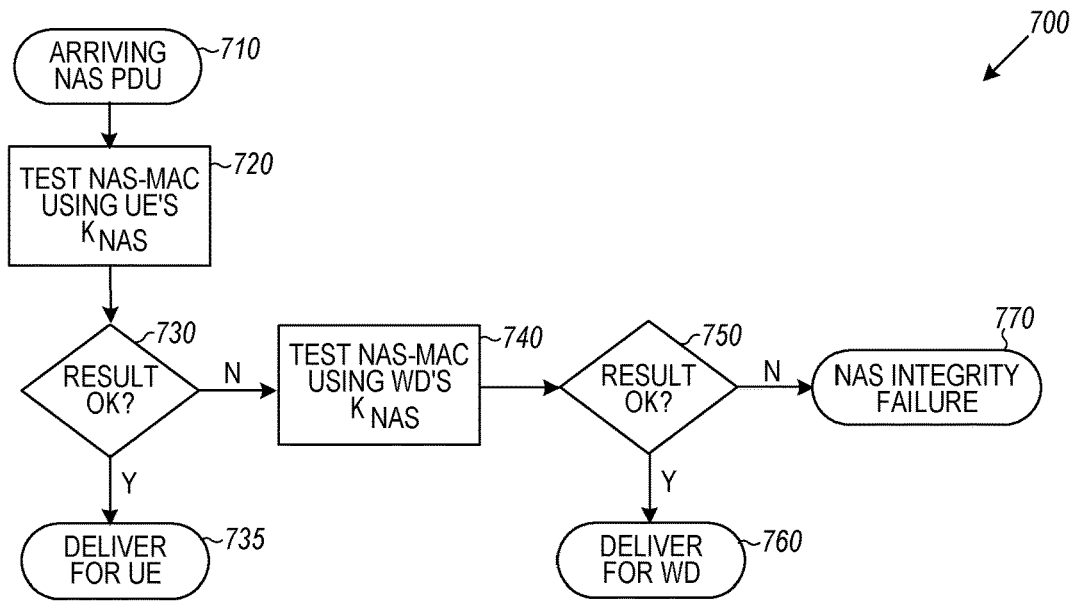
FIG. 7 is a flowchart illustrating a basic NAS message demultiplexing procedure according to an example embodiment.

FIG. 7 is a flowchart illustrating a basic NAS message demultiplexing procedure 700, applicable to both the UE and the MME. In this second option, the eNB applies normal NAS routing procedures, meaning that all NAS PDUs from the UE's RRC connection will be delivered over the S1 bearer to the UE's context as an arriving NAS PDU at 710. The MME can then attempt to apply the UE's NAS security for an integrity check at 720 by testing the NAS-MAC (message authentication code) using the UE's key—$K_{NAS}$ (UE). If the result is ok at 730, the message is passed for delivery to the UE at 735. If the NAS PDU is intended for the WD, operation will fail at 730, and the MME can pass the NAS PDU on to the WD context (this is the same demultiplexing procedure that the UE performs in the downlink direction). If testing the NAS-MAC using the WD's $K_{NAS}$ at 740 passes as indicated at 750, the message is passed for delivery to the WD at 760. If not, an NAS integrity failure occurs at 770. Note that if there are multiple WDs attached to the same UE, this procedure 700 is carried out repeatedly until a match is found. The integrity check is not especially burdensome on the receiver, so the performance impact would not be expected to be large.

For most NAS messages, an integrity failure results only in a silent discard of the message, so there is no concern with the ambiguity as to whether the failure "belongs" to the UE or WD context. However, certain NAS messages require some action in case of failure (notably TAU and service request), and these cases would need to be handled with care.

Also, note that certain NAS messages can be legitimately sent without integrity protection (3GPP security technical specification—TS 24.301, sections 4.4.4.2 and 4.4.4.3). Special handling for these scenarios may be provided as discussed below. One approach would be simply to stipulate that the concerned NAS procedures can only be performed for a WD with a direct path to the network.

A third option for NAS routing would be to define a separate SRB for proxy NAS messages.

Figure 8:
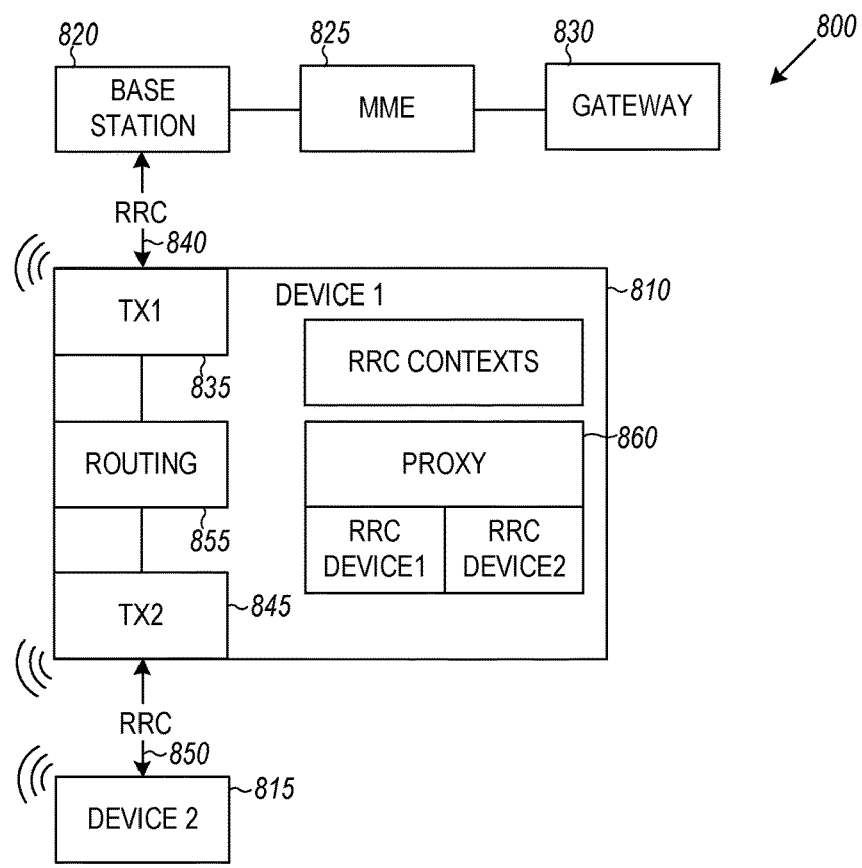
FIG. 8 is a block diagram illustrating proxy NAS security according to an example embodiment.

FIG. 8 is a block diagram illustrating proxy NAS security, version 3 or case 3 generally at 800. Elements of proxy NAS security include a first device 810 such as a UE, and a remote second device 815 such as a WD that have a direct wireless connection between them. First device 810 is also wirelessly connected to a base station 820, such as an eNB. MME 825 and a gateway 830 are also illustrated. In one embodiment, first device 810 includes a first transceiver (TX1) at 835 configured to receive and transmit cellular communications base station 820 utilizing RRC messages as indicated at 840. A second transceiver (TX2) at 845 is configured to receive and transmit signals with the second device 815 via a lower power communication link and RRC messages as indicated at 850. A routing entity 855 is coupled to the first transceiver 835 and the second transceiver 845 to route communications intended for the first device 810 and the second device 815. A proxy entity 860 is coupled to the routing entity 855. The proxy entity 860 provides secure communications with the second device 815 via at least one messaging protocol layer such that the first device 810, a cellular communication device operates as a secure relay between the second device 815 and the base station 810, multiplexing radio resource control (RRC) messages for both the first device 810 and the second device 815 over a single wireless RRC connection to the base station 820. The multiplexing of RRC messages may utilize RRC contexts indicated at 865 for the first device 810 and 870 for the second device 815.

Figure 9:
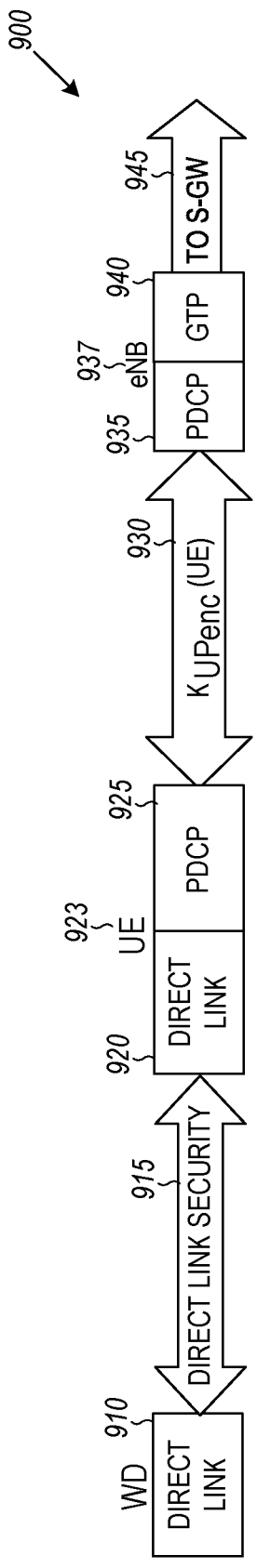
FIG. 9 is a block diagram of a user plane utilizing re-encryption for the proxy NAS version according to an example embodiment.

FIG. 9 is a block diagram of a user plane 900 utilizing re-encryption for the proxy NAS version. WD 905 has a direct link 910 with direct link security 915 to a direct link 920 in the UE 923. The UE 923 utilizes PDCP 925 with an uplink encryption key $K_{UPenc}$ 930 to couple to PDCP 935 in the eNB 937. The eNB uses GTP 940 to communicate 945 with an S-GW. Since user-plane security is handled at the eNB 937, with termination in PDCP 935 and relaying to a separate security context over S1u at 945, handling this security in the proxy-NAS architecture requires some additional steps. In fact, without having an RRC context for the WD 945, the eNB 937 cannot derive a user-plane key for the WD 905 (the key derives from a UE-specific $K_{eNB}$).

With no special handling the R-UE has cleartext access to WD traffic, and (in the uplink direction; mutatis mutandis for the downlink) re-encrypts the traffic with its own $K_{UPenc}$ for transmission to the eNB To resolve this problem, the WD 905 and eNB 937 may share a key, and a user-plane security association, not known to the relay UE 923. Since the MME already has a $K_{ASME}$ for the WD 905, the information is available to derive a corresponding $K_{eNB}$ and thence $K_{UPenc}$; however, the WD 905 does not consider itself to be in service with this eNB 923 and must somehow be "tricked" into deriving the same keys itself.

Figure 10:
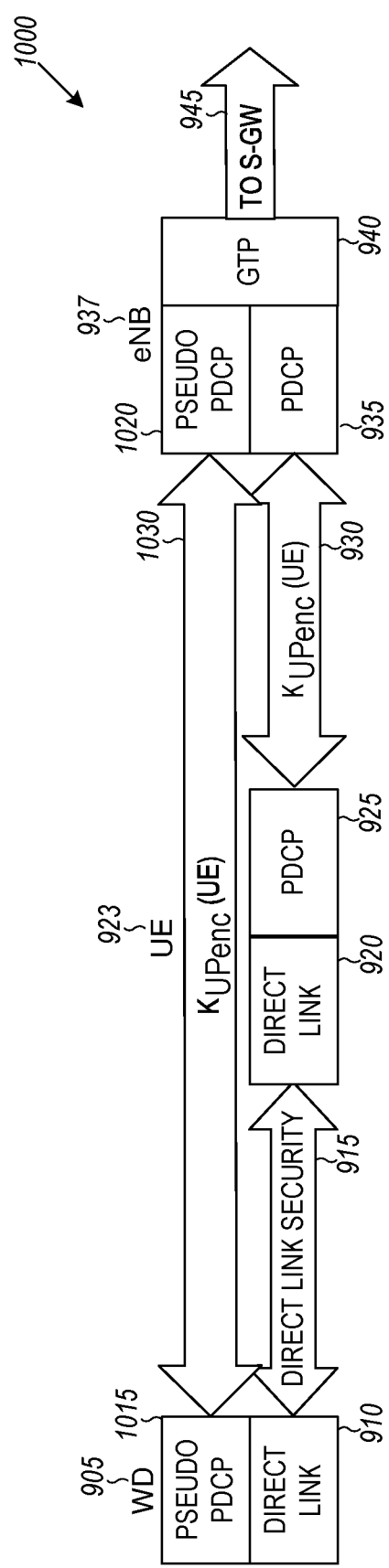
FIG. 10 is a block diagram illustrating an alternative user plane having security transparent to a relay UE according to an example embodiment.

FIG. 10 is a block diagram illustrating an alternative user plane 1000 having security transparent to the relay UE. Reference numbers in FIG. 10 are consistent with similar elements in FIG. 9. The WD 905 and eNB 937 perform user-plane security transparently to the UE 923 via pseudo PDCPs 1015 and 1020 in WD 905 and eNB 937 respectively.

Assuming the appropriate key $K_{UPenc}$(WD) 1030 has been derived, the eNB applies a distinctive procedure to processing data sent to [resp. received from] the UE's DRB that corresponds to the WD 905. Upon receiving a packet from [resp. before delivering a packet to] the corresponding TEID, it encrypts [resp. decrypts] the packet using the WD's $K_{UPenc}$ 1030. For the eNB implementation, the process may be modeled as a characteristic of the EPS bearer, rather than maintaining a partial context for the WD even though the WD is not RRC connected. Alternatively, the eNB could maintain a partial context for the WD and process security as a function of that partial context.

Figure 11:
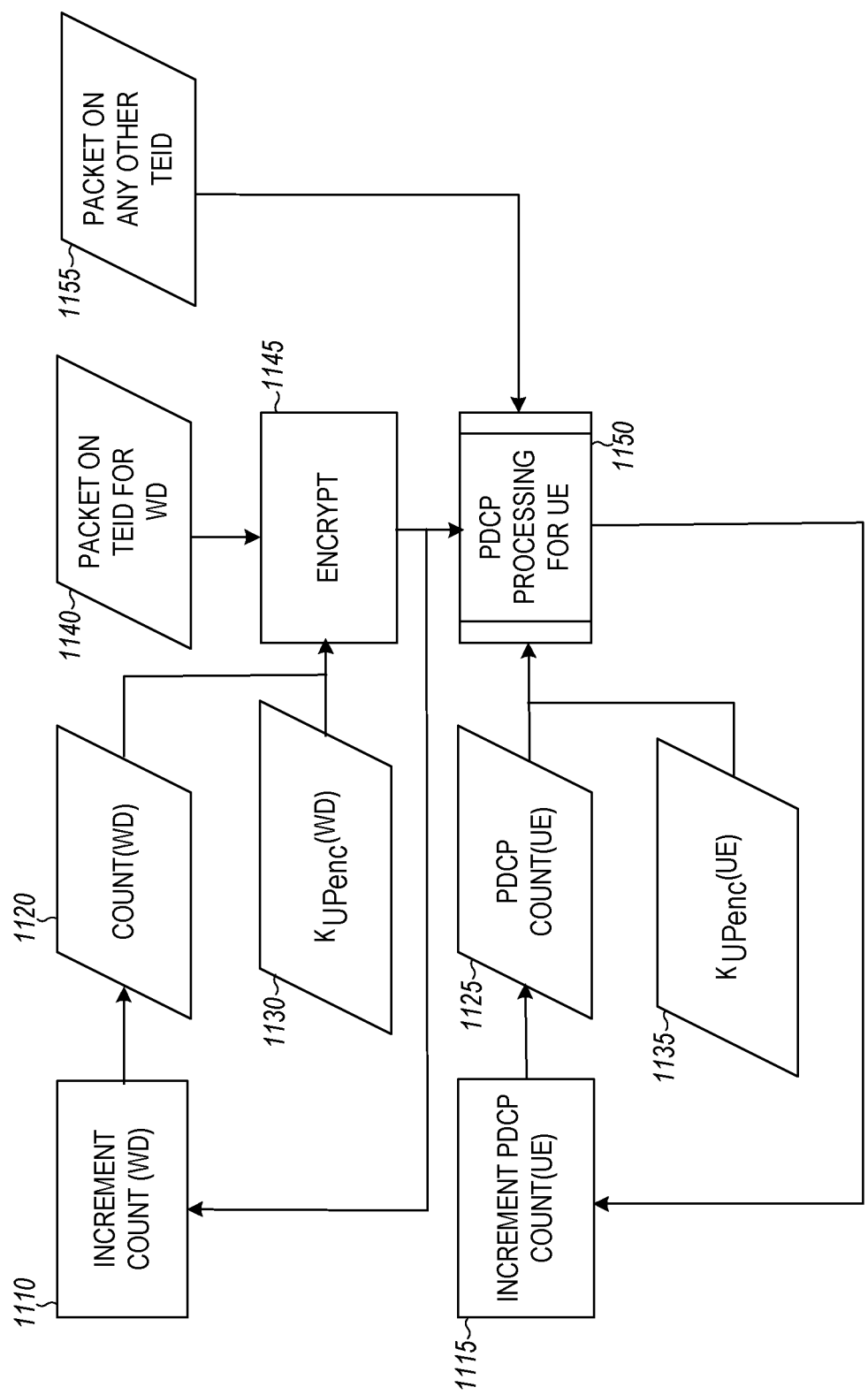
FIG. 11 is a flowchart illustrating a method of processing user-plane packets to protect WD traffic (downlink direction) to maintain synchronization of keys and data packets according to an example embodiment.

FIG. 11 is a flowchart illustrating a method 1100 of processing user-plane packets to protect WD traffic (downlink direction) to maintain synchronization of keys and data packets, also referred to as cryptosync. Method 1100 is performed on a UE context in an eNB in one embodiment. Counts for the WD and UE are incremented at 1110 (COUNT(WD)) and 1115 (COUNT(UE)) and stored at 1120 and 1125 respectively. Corresponding keys $K_{UPenc}$(WD) and $K_{UPenc}$(UE) maintained at 1130 and 1135 and correlated to the respective counts.

A packet may be received on TEID for the WD at 1140 and is encrypted at 1145. This triggers incrementing of the WD count at 1110, and the encrypted packet is also provided to a PDCP processing unit for the UE at 1150. A packet from any other TEID at 1155 may also be provided to the PDCP processing unit 1150. PDCP processing unit 1150 uses the PDCP count for the UE at 1125 and corresponding key from 1135 and may encrypt the packet for the UE, while incrementing the count at 1115.

The normal trigger for derivation of the user-plane key in the UE is an RRC procedure (connection establishment or receipt of a SecurityModeCommand message), which is not applicable in this situation where the WD has no RRC entity. The contents of the SecurityModeCommand (algorithm identifiers only) can, however, be passed through a message of the direct link, or they could be hardcoded or otherwise configured out of band in the WD. Either case allows the WD to derive $K_{eNB}$ and subsequently the needed user-plane keys. (The uplink NAS COUNT value is a required input for the derivation of $K_{eNB}$, but this value is already available since the WD has a NAS protocol entity.) In short, once the NAS proxy relationship is established between the WD and the UE, the WD can derive user-plane keys autonomously provided it knows the algorithm family to be used.

On the other hand, the eNB needs to be triggered explicitly to perform the same derivation, since it is not aware of the status of the proxy NAS layer and has no $K_{eNB}$ associated with the WD. Since the user-plane key is associated for the eNB with a particular TEID, it seems sensible to trigger the key derivation when the corresponding EPS bearer is established, i.e., provide a trigger and the needed information in the E-RAB CONTEXT SETUP REQUEST message from the MME. This information consists solely of $K_{eNB}$ and the algorithm identifier (which as with the WD could be hardcoded or otherwise configured), so the impact to the message is limited.

Figure 12:
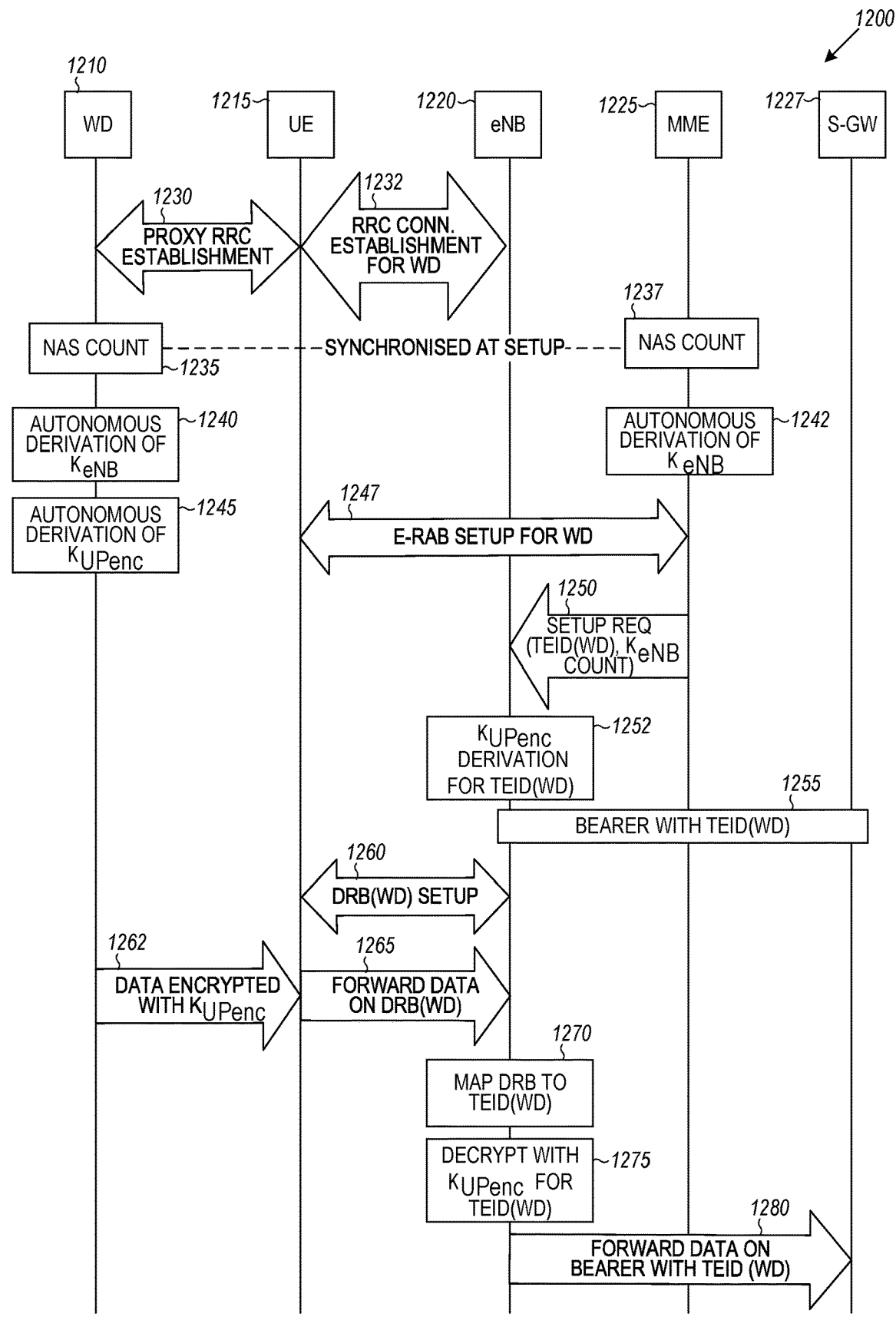
FIG. 12 is a message flow diagram illustrating establishment of a key for WD according to an example embodiment.

FIG. 12 is a message flow diagram illustrating user plane keying 1200 for proxy NAS security. User plane keying 1200 illustrates actions and communications between a WD 1210, UE 1215, eNB 1220, MME 1225, and S-GW 1227. At 1230, a proxy RRC is established between WD 1210 and UE 1215. At 1232, an RRC connection is established for the WD 1210 between the UE 1215 and the eNB 1220. NAS COUNTs 1235 and 1237 are synchronized at setup.

WD 1210 and MME 1225 each derive $K_{eNB}$ autonomously at 1235 and 1237. WD 1210 also derives $K_{UPenc}$ autonomously at 1245 when a protocol entity is created. E-RAB 1247 is also setup for the WD 1210 between the UE 1215 and MME 1225. At 1250, the MME sets up req(TEID (WD), $K_{eNB}$, COUNT) with eNB 1220. A bearer 1255 with TEID(WD) is established between S-GW 1227 and eNB 1220. At 1260, DRB(WD) setup occurs between eNB 1220 and UE 1215. At 1262, the WD 1210 forwards data encrypted with $K_{UPenc}$ to the UE 1215, which forwards the data on DRB(WD) to the eNB. The eNB 1220 maps the DRB to TEID(WD) at 1270 and decrypts with $K_{UPenc}$ for TEID(WD) at 1275. The data is then forward on the bearer with TEID(WD) at 1280.

The WD 1210 is considered to have its own RRC connection and corresponding context in the eNB, with separate security operation for the two devices. In some embodiments, the WD has its own C-RNTI issued by the serving eNB. Although no airlink signaling would actually be directed to the WD, control-plane messages that would normally be distinguished by C-RNTI propagate through the RRC protocol layer, suggesting that the WD should have a recognizable "RRC identity".

Figure 13:
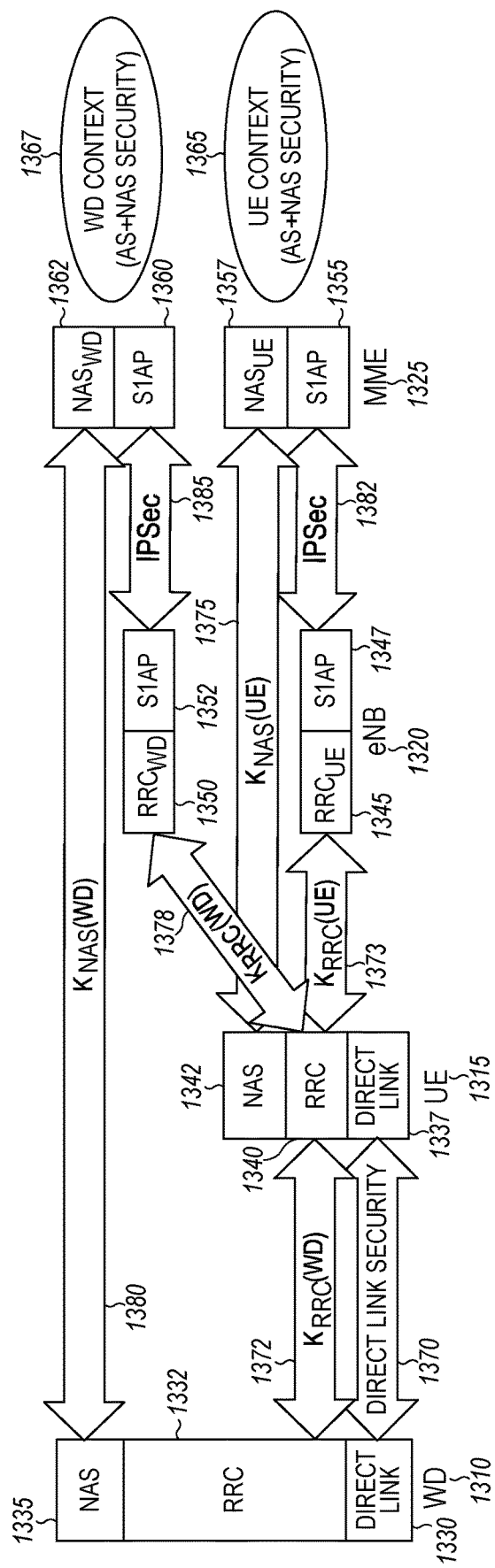
FIG. 13 is a block diagram of control plane stacks for proxy RRC according to an example embodiment.

FIG. 13 is a block diagram illustrating proxy RRC control plane stacks 1300 for control messages for managing connections. The entities taking part in proxy RRC control plane stacks 1300 include WD 1310, UE 1315, eNB 1320, and MME 1325. Control layers for WD 1310 include a direct link 1330, RRC 1332, and NAS 1335. Layers for UE 1315 include direct link 1337, RRC 1340, and NAS 1342. eNB 1320 includes $RRC_{UE}$ 1345, and S1AP 1347 for the UE, and $RRC_{WD}$ 1350 and S1AP 1352 for the WD. MME similarly contains S1AP 1355 and $NAS_{UE}$ 1357 for the UE 1315, and S1AP 1360 and $NAS_{WD}$ 1362 for the WD 1310. A UE context 1365 and WD context 1367 both provide AS and NAS security.

Direct link security 1370 is provided between WD 1310 and UE 1315. RRC keys 1372 ($K_{RRC}$(WD)) and 1373 ($K_{RRC}$(UE)) are used between the WD 1310, UE 1315 and eNB 1320. The UE NAS key is also used at 1375 between the UE 1315 and eNB 1320. An RRC WD key is used between UE 1315 and eNB 1320. Some of the links are shown with the corresponding security algorithm and/or keys used to protect the associated interfaces. Note that the keys are not passed via the links in some embodiments, and may be derived by the respective connected entities. Thus, a single RRC connection communicates with security provided by both RRC keys for the UE and WD. A WD NAS key ($K_{NAS}$(WD)) 1380 is used between the UE 1315 and MME 1325. IPSec is used between respective UE and WD connections between the eNB 1320 and MME 1325 at 1382 and 1385 respectively.

This situation is unusually modeled in protocol terms, because a single RRC entity in the UE is interpreted as two different RRC entities in the eNB, with the two RRC entities in the eNB corresponding to different S1 resources, but using the same over-the-air RRC connection. The eNB receives messages from the UE, over that common connection, some of which originate from the WD and others from the UE. The eNB can disambiguate these messages by various methods, including as an example the same sort of demultiplexing procedure described for the NAS layer in case 2 (and the UE's RRC layer needs to perform a similar procedure to distinguish its own RRC messages in the downlink from those destined for the WD). There is no such problem in the user plane, since the WD's user plane has its own radio bearer in this exemplary architecture. An architecture with user plane traffic for the WD and the UE multiplexed together on a single radio bearer would require a method to distinguish data for the two devices.

The security handling of RRC messages from the WD requires some care to avoid a "double security" problem (e.g., encrypting the message first with the WD key, and then again with the UE key, so that the eNB would need to decrypt it twice). The simplest approach is for the UE's proxy RRC entity to function in this respect as a PDCP relay, performing no security procedures of its own (apart from possibly those needed for a "check-and-fail" routing mechanism); an RRC message from the WD to the UE is delivered to the eNB over SRB2 exactly as it arrived. (Note that the UE must maintain separate sequence numbers for the WD and UE PDCP layers underlying the RRC protocol; this design might equally be described as "proxy PDCP".)

Figure 14:
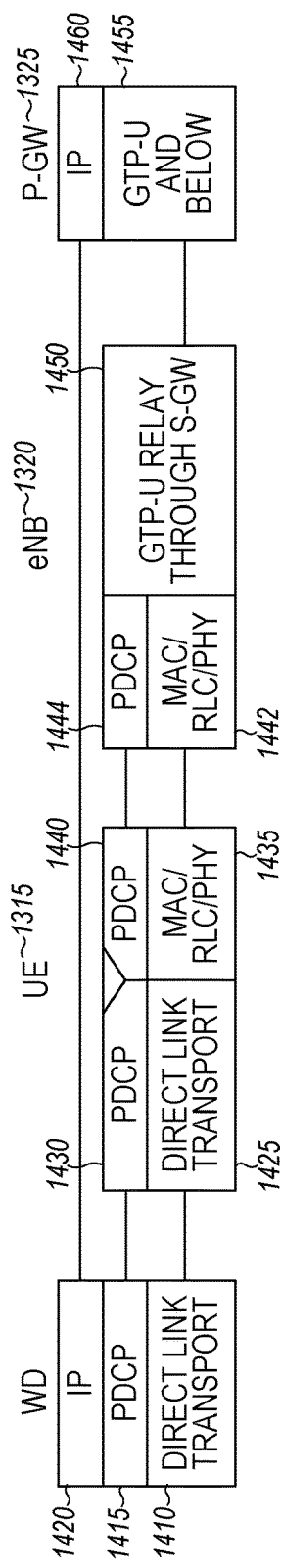
FIG. 14 is a block diagram of user plane protocol stacks for a radio bearer communicating with the remote device according to an example embodiment.

Corresponding user plane 1400 protocol stacks are shown in block diagram form in FIG. 14, where reference numbers are similar to those in the control plane view of the proxy RRC in FIG. 13. User plane 1400 represents user data flow between devices. WD 1310 includes direct link transport 1410, PDCP 1415 and IP 1420. UE 1315 includes direct link transport 1425, PDCP 1430, MAC/RLC/PHY (radio link control and physical layer respectively) 1435, and PDCP 1440. eNB 1320 includes MAC/RLC/PHY 1442, PDCP 1444, and GTP-U relay through S-GW 1450. P-GW 1325 includes GTP-U and below 1455, and IP 1460. IP 1420 passes data to IP 1460 in P-GW 1325.

In the user plane 1400, the WD 1310 traffic is concentrated on one DRB (of the UE 1315) as seen by the eNB 1320, with its own PDCP entity, security keys, and so on. The UE 1315 devotes one DRB to this WD 1310, and as with the RRC it supplies no security processing of its own, functioning for that DRB only as a PDCP relay. (As in the other options, multiple DRBs could also be used to separate traffic based on QoS or other criteria, with the security mechanisms applied separately to each DRB.)

For security to work properly on this bearer, the UE 1315 treats security transparently for PDCP purposes, and the eNB 1320 associates it with the WD's context rather than the UE's context. This association can be formed at the time of DRB setup, when the eNB 1320 should already be aware that it is processing a proxy RRC connection for the WD 1310.

Note that, because the WD 1310 has a dedicated DRB in the foregoing description, this solution encounters scaling problems if one UE 1315 serves as a proxy for more than a very small number of WDs. For this reason it would be desirable for traffic from multiple WDs to be aggregated on a single DRB over the air (e.g., traffic with similar QoS requirements from different devices could be grouped together). Such aggregation presents a routing problem, however, since the data flows from different WDs would need to be handled by different PDCP entities for security processing; it is not well supported by the proxy-RRC approach without some redesign of radio protocols to decouple PDCP entities from DRBs.

In this user plane 1400 model, the MME is actually unaware that the WD 1410 is being routed through the indirect path through a UE 1415. The eNB 1420 presents to it the illusion of entirely separate contexts for the UE 1415 and WD 1410, and the security aspects are managed independently. This case is clearly the simplest option from the security perspective. However, it may be problematic in other ways precisely because of the transparency to the MME; if core-network functions such as billing need insight into the association between the WD 1410 and the UE 1415, the transparency may make that insight difficult. Additional information in the S1-AP messaging could inform the MME that the WD 1410 is in indirect mode, at the cost of broader protocol impact.

For all the versions, at the time of network attach, the MME initiates security on the NAS layer with a SECURITY MODE COMMAND. To reach this point in the procedure when the WD attaches, the MME must have received, and correctly associated with the WD, an ATTACH REQUEST message without integrity protection which may be problematic for proxy NAS and proxy RRC versions.

In one embodiment, attach procedures over the indirect path may have an artificial requirement imposed that the WD must be already in EMM-REGISTERED, with a valid EPS security context, before it can use indirect-path routing. In further embodiments, attachment and security initiation can take place entirely through the indirect path, using any of the three versions described above.

In the UE only security version, case 1, where all WD security is handled by the UE, the operation is fundamentally impossible without additional protocol support, as the WD on the indirect path lacks the necessary protocol termination points.

In proxy RRC, version 3 corresponding to case 3, once RRC security for the WD and the NAS signaling connection between the WD and the MME are established, all control-plane messages can be routed unambiguously using the same check-and-fail procedure described above for the RRC rather than the NAS layer. However, establishment of the WD's RRC security already depends on having $K_{ASME}$ for the WD, i.e., the WD must have performed an authentication and key exchange (AKA) procedure and the eNB should have enough knowledge of the WD to allow the derivation of $K_{eNB}$. So the eNB should have the capability to recognize and route several NAS messages in each direction without integrity protection (ATTACH REQUEST, AUTHENTICATION REQUEST, and AUTHENTICATION RESPONSE, at a minimum), and similarly the UE's RRC entity must be able to distinguish when these messages are intended for the WD. The various Security Mode messages may be sent with integrity protection, after authentication vectors have been obtained, so they can be routed with the check-and-fail procedure.

Figure 15:
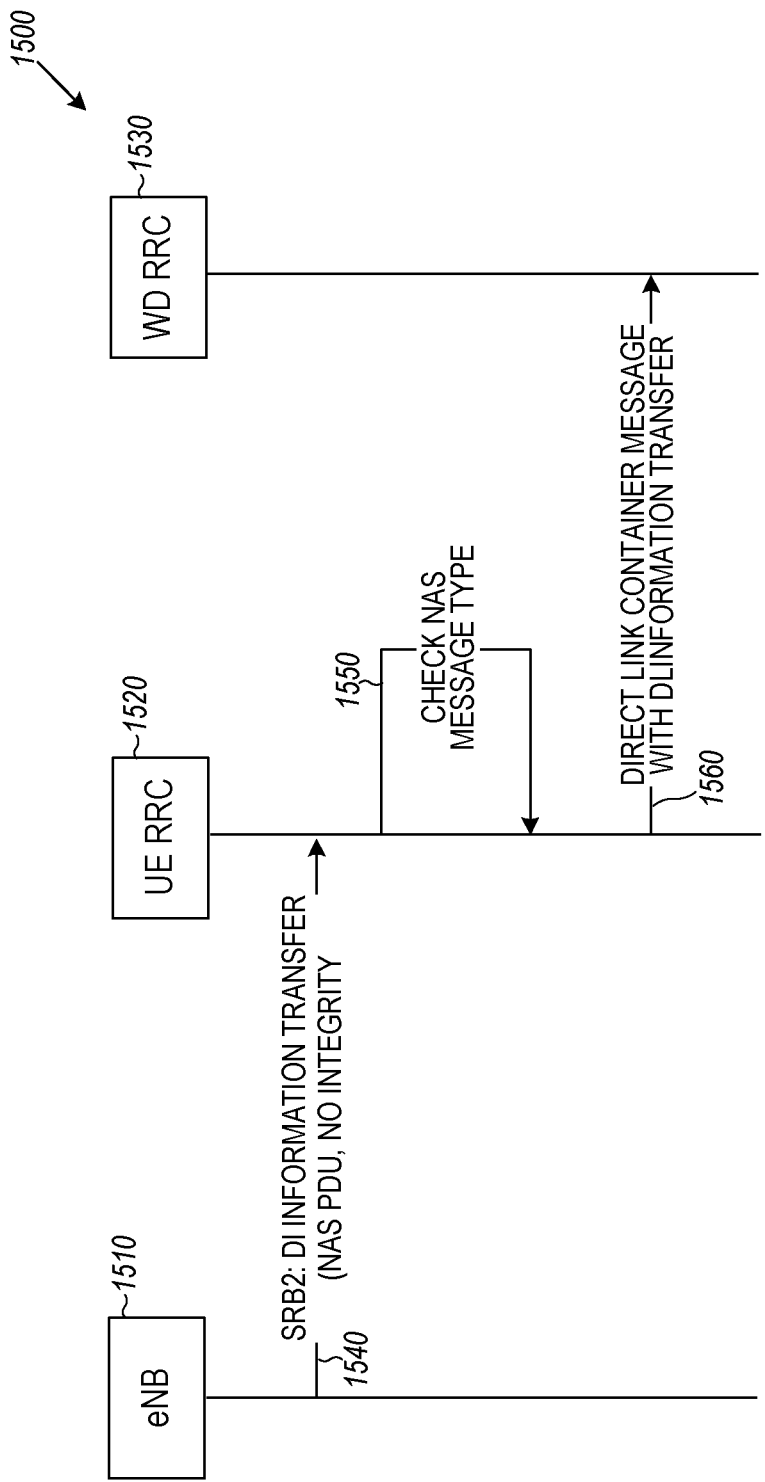
FIG. 15 is a message flow diagram illustrating forwarding of NAS messages without integrity according to an example embodiment.

FIG. 15 is a message flow timing diagram 1500 illustrating a method of forwarding NAS messages without integrity. The messages are forwarded between an eNB 1510, UE RRC 1520, and WD RRC 1530. At 1540, direct link information SRB2 is sent as DLInformationTransfer (NAS PDU, no integrity) from eNB 1510 to UE RRC 1520. UE RRC 1520 performs a check NAS message type at 1550 and then sends a direct link container message at 1560 with DLInformationTransfer.

The simplest possibility is that, when the RRC entity sees a NAS PDU that is not integrity-protected after the setup of SRB2 towards the UE, it assumes it belongs to the WD and forwards it accordingly to the corresponding WD RRC. Alternatively, this behavior could be restricted to the NAS messages for which delivery without integrity protection is permitted in TS 24.301. (Note, however, that this transparent approach only works when the UE serves a single WD; there is no straightforward way to handle such forwarding of NAS messages to multiple WDs.)

Finally, proxy NAS, version 2, case 2, can use a similar approach to proxy RRC, but with the NAS layer rather than the RRC layer. There is only a single SRB2 between the eNB and the UE, as in proxy RRC, but in this case it also delivers to a single NAS entity. That NAS entity, which for integrity-protected messages uses the check-and-fail routing procedure, will do essentially the same thing in this situation, treating the unprotected NAS message as an "automatic fail" and routing it onward to the WD's NAS.

However, this means that it both proxy NAS and proxy RRC, it becomes impossible to deliver any unsecured NAS message to the UE, even for the occasional cases where it would be correct to do so (e.g., loss of security context information in the HSS). For a UE serving a WD via indirect path, it appears that these cases must be handled by detaching all WDs first.

There are three protocol models by which WDs could be connected through a UE, with distinct effects on security handling.
1. No active WD context, all security handled by UE. ("UE-only security")
2. The WD has a NAS entity but no RRC entity, and NAS security is end-to-end between WD and MME. ("Proxy NAS")
3. The WD has NAS and RRC entities and the illusion of an RRC connection, with separate RRC security between WD and eNB, and between UE and eNB. Each proxied WD may occupy its own radio bearer, with PDCP relayed transparently through the UE to the eNB. ("Proxy RRC")

UE-only security offers a simple protocol model, but has two potentially serious drawbacks: It disables all NAS signaling with the WD, and it allows the UE cleartext access to all the WD's traffic.

Proxy NAS and proxy RRC approaches are similar to one another from an architectural point of view, varying mainly in which layer applies the check-and-fail demultiplexing algorithm. The proxy-NAS model gives the MME more insight into the association between the UE and the WD; in the proxy-RRC model, the indirect-path association actually could be concealed completely from the MME. These differences could be avoided with messaging changes, such as adding a field to NAS-containing RRC messages that could be used to indicate "message related to proxied WD". Both impose certain restrictions on the handling of unsecured messages in NAS.

Applying security to the user plane in such a way that the relay UE does not have cleartext access to the WD's traffic is challenging in the proxy-NAS model, requiring a shallow "pseudo PDCP" layer between the WD and the eNB and distinguished security processing at the eNB for certain TEIDs. The required support is not complex in any one place, but impacts multiple network nodes and protocol layers.

The transparency of the proxy-RRC model is architecturally attractive, but may actually be a disadvantage for CN (core network) functions like billing. Since it uses a separate DRB for each WD, it may scale poorly if more than a few WDs are to be relayed through a single UE.

Figure 16:
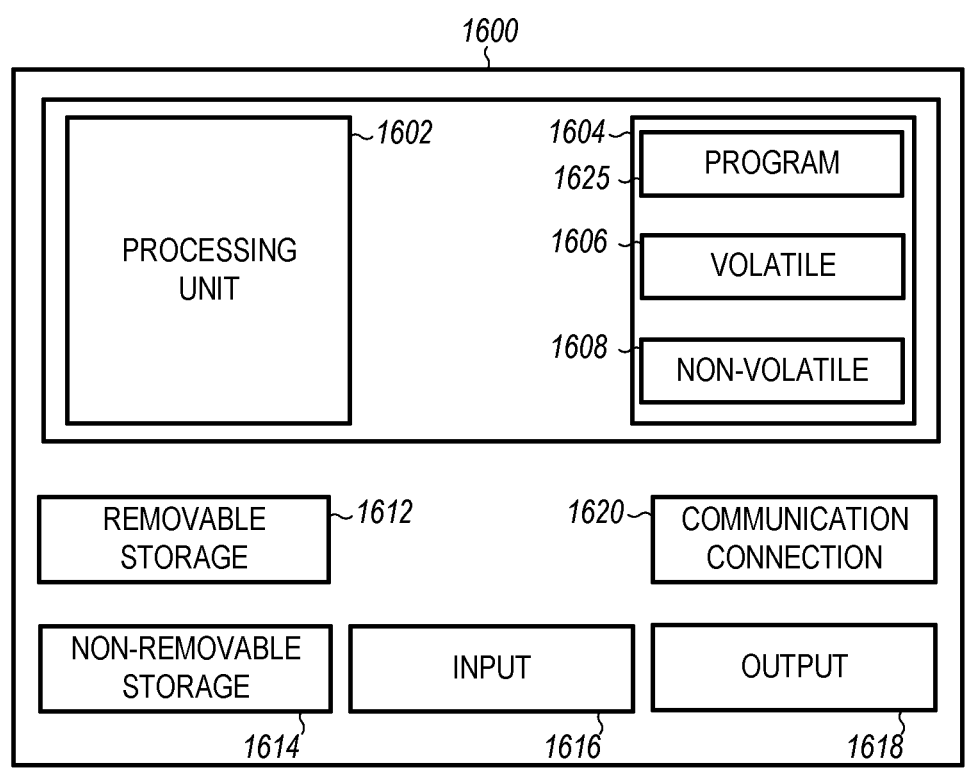
FIG. 16 is a block diagram of circuitry for implementing one or more devices and methods according to example embodiments.

FIG. 16 is a block schematic diagram of a computer system 1600 to implement the controller and methods according to example embodiments. All components need not be used in various embodiments.

One example computing device in the form of a computer 1600 may include a processing unit 1602, memory 1603, removable storage 1610, and non-removable storage 1612. Although the example computing device is illustrated and described as computer 1600, the computing device may be in different forms in different embodiments. For example, the computing device may instead be a smartphone, a tablet, smartwatch, or other computing device including the same or similar elements as illustrated and described with regard to FIG. 16. Devices such as smartphones, tablets, and smartwatches are generally collectively referred to as mobile devices. Further, although the various data storage elements are illustrated as part of the computer 1600, the storage may also or alternatively include cloud-based storage accessible via a network, such as the Internet.

Memory 1603 may include volatile memory 1614 and non-volatile memory 1608. Computer 1600 may include— or have access to a computing environment that includes—a variety of computer-readable media, such as volatile memory 1614 and non-volatile memory 1608, removable storage 1610 and non-removable storage 1612. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1600 may include or have access to a computing environment that includes input 1606, output 1604, and a communication connection 1616. Output 1604 may include a display device, such as a touchscreen, that also may serve as an input device. The input 1606 may include one or more of a touchscreen, touchpad, mouse, keyboard, camera, one or more device-specific buttons, one or more sensors integrated within or coupled via wired or wireless data connections to the computer 1600, and other input devices. The computer may operate in a networked environment using a communication connection 1620 to connect to one or more remote computers, such as database servers. The remote computer may include a personal computer (PC), server, router, network PC, a peer device or other common network node, or the like. The communication connection 1620 may include one or more transceivers capable of sending and receiving information via a Local Area Network (LAN), a Wide Area Network (WAN), cellular, WiFi, Bluetooth, or other networks.

Computer-readable instructions stored on a computer-readable medium are executable by the processing unit 1602 of the computer 1600. A hard drive, CD-ROM, and RAM are some examples of articles including a non-transitory computer-readable medium, such as a storage device. The terms computer-readable medium and storage device do not include carrier waves. For example, a computer program 1618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1600 to provide generic access controls in a COM based computer network system having multiple users and servers.

The following are slides that provide a further description of the inventive subject matter:

The architecture for UE relaying, including security aspects, should be adaptable to a variety of technologies to support the direct link between the WD and the R-UE. Especially with wearables, PAN technologies such as Bluetooth offer an attractive incumbent technology for this purpose. Accordingly, the inventive subject matter minimizes assumptions about the protocol stack of the WD, confining those assumptions to the functionality strictly necessary to establish the relaying relationship while benefiting from the robust 3GPP security architecture.

Three versions of a solution follow, using different protocol layers and proxying arrangements.

"UE-only" security: No active context for the WD, and all security handled by the UE.

"Proxy NAS": The WD has a NAS entity but no RRC entity; NAS security end-to-end from WD to MME.

"Proxy RRC": The WD has NAS and RRC entities and considers itself RRC connected; the UE (to eNB) and WD (to eNB) have separate security contexts. Each WD has its own DRB, for which the UE is a PDCP relay.

All of them create some difficulty with allowing a WD to start operating through the indirect path, i.e., to attach to the CN and establish security. There are also certain restrictions, different for each solution, on what NAS messaging can be supported.

The connections involved in supporting the indirect-path case are many, and interlock in a somewhat complex way. While the WD is shown as an endpoint, many different proxied device may be used in further embodiments.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
   operating, by a mobile device in a wireless network, as a proxy protocol entity comprising a proxy access stratum (AS) entity;
   establishing, by the proxy AS entity, an indirect connection of a first device to a node of the wireless network using the mobile device as an intermediate node for wireless transport, the indirect connection comprising an AS protocol layer; and
   transferring, by the proxy AS entity, data over the indirect connection via a first wireless link comprising a direct device connection between the first device and the mobile device and a second wireless link comprising a direct 3GPP (3rd Generation Partnership Project) connection between the mobile device and the node of the wireless network;
   wherein a security association for the AS protocol layer is between the first device and the node of the wireless network, such that signaling and data traffic through the mobile device are protected at the AS protocol layer.

2. The method of claim 1 wherein:
   the first device and the node of the wireless network share at least one security key usable to protect data for the first device, the at least one security key being associated by the node of the wireless network with a data radio bearer (DRB) for the first device, the DRB for the first device being associated with a network bearer identified in the node of the wireless network based at least in part on a tunnel endpoint identifier (TEID); and
   data protected with the at least one security key is delivered by the mobile device between the first device and the wireless network without being removed by the mobile device from a protected condition.

3. The method of claim 1, wherein the proxy AS entity communicates with an AS entity in the first device and wherein the AS protocol layer is a radio resource control (RRC) protocol layer.

4. The method of claim 3, further comprising:
   multiplexing RRC messages for both the first device and the mobile device over a single wireless RRC connection between the mobile device and the node of the wireless network.

5. The method of claim 3, wherein:
   the proxy AS entity maintains a cell radio network temporary identifier (C-RNTI) corresponding to the first device; and the security association is established based at least in part on a first security context maintained within the wireless network for the first device.

6. The method of claim 3, wherein:
the mobile device receives AS protocol messages for the first device and for the mobile device on a common signaling radio bearer from the wireless network;
the mobile device identifies the AS protocol messages for the first device by a process of demultiplexing comprising;
applying a first security-related procedure for the mobile device to a received AS message;
detecting a failure in the first security-related procedure;
applying a second security-related procedure for the first device to the received AS message; and
detecting a success in the second security-related procedure; and
based on the detection of the success in the second security-related procedure, the mobile device delivers to the first device the AS protocol messages for the first device.

7. The method of claim 6, wherein:
the first device is one of a plurality of devices; and
the applying of the second security-related procedure for the first device to the received AS message is part of applying the second security-related procedure for each device of the plurality of devices.

8. The method of claim 6, wherein the mobile device forwards to the node of the wireless network an AS protocol message received from the first device, without applying a security operation to the AS protocol message.

9. The method of claim 1, wherein:
the node of the wireless network maintains a cryptosync value associated with the first device;
the node of the wireless network updates the cryptosync value to reflect a security operation using at least one security key when it performs an encryption operation using the at least one security key;
the node of the wireless network updates the cryptosync value when it performs a decryption operation using the at least one security key; and
the node of the wireless network updates the cryptosync value when it succeeds in performing an integrity operation using the at least one security key.

10. The method of claim 9, further comprising deriving, by a mobility management entity, the at least one security key in response to a protocol message received from the mobile device.

11. A cellular communication device comprising:
at least one transceiver;
a non-transitory memory storage comprising instructions; and
one or more processors in communication with the memory and the at least one transceiver,
wherein the one or more processors execute the instructions to:
operate as a proxy protocol entity comprising a proxy access stratum (AS) entity;
configure the at least one transceiver to receive and transmit cellular communications with a base station;
configure the at least one transceiver to receive and transmit signals with a remote device via a lower power communication link;
route, using the proxy AS entity, communications intended for the cellular communication device and the remote device; and
provide secure communications with the remote device via at least one messaging protocol layer such that the cellular communication device operates as a secure relay between the remote device and the base station, multiplexing radio resource control (RRC) messages for both the cellular communication device and the remote device over a single wireless RRC connection to the base station; and
wherein the remote device and the base station share at least one security key usable to protect data for the remote device, the at least one security key being associated by the base station with a data radio bearer (DRB) for the remote device, the DRB for the remote device being associated with a network bearer identified in the base station based at least in part on a tunnel endpoint identifier (TEID), and wherein data protected with the at least one security key is delivered by the cellular communication device between the remote device and the base station, protected at an AS protocol layer.

12. The cellular communication device of claim 11, wherein the at least one transceiver communicates with the base station over at least one logical bearer that is associated with a TEID assigned for communication with at least the remote device.

13. The cellular communication device of claim 12, wherein the one or more processors further execute the instructions to identify data directed from the base station to the remote device based at least in part on interpreting the TEID as a distinguishing identifier.

14. The cellular communication device of claim 12, wherein the one or more processors further execute the instructions to direct data from the remote device to the base station based at least in part on sending the TEID as a distinguishing identifier.

15. The cellular communication device of claim 11, wherein:
the AS protocol layer comprises an RRC protocol layer; and
the one or more processors further execute the instructions to maintain an identifier comprising a cell radio network temporary identifier (C-RNTI) corresponding to the remote device.

16. The cellular communication device of claim 11, wherein the proxy AS entity communicates with an AS entity in the remote device and wherein the AS protocol layer is an RRC protocol layer.

17. A base station comprising:
a non-transitory memory storage comprising instructions; and
one or more processors in communication with the memory, wherein the one or more processors execute the instructions to:
establish a user equipment (UE) radio resource control (RRC) connection to a UE;
access security portions of a UE context and a remote device context for a remote device, each context comprising separate access stratum (AS); and
perform encryption operations using separate encryption keys for the UE and the remote device such that communications for the UE are encrypted using a UE key and communications for the remote device are encrypted using a remote device key; and wherein the remote device and the base station share the remote device key to protect communications for the remote device, the remote device key being associated by the base station with a data radio bearer (DRB) for the remote device, the DRB for the remote device being associated with a network bearer identified in the base station based at least in part on a tunnel endpoint identifier (TEID), and wherein communications between the base station and the remote device are sent and received over the UE RRC connection to the UE operating as a proxy RRC entity.

18. The base station of claim 17 wherein the UE context and remote device context further maintain non-access stratum (NAS) security respectively for the UE and remote device.

19. The base station of claim 17 wherein the UE and base station share at least one security key usable to protect data for the remote device, and wherein data protected with the at least one security key are delivered by the UE between the remote device and the base station without being removed by the UE from a protected condition.

20. The base station of claim 17, wherein the one or more processors further execute the instructions to:
   maintain a cryptosync value associated with the remote device;
   update the cryptosync value to reflect a security operation using at least one security key when performing an encryption operation using the at least one security key;
   update the cryptosync value when performing a decryption operation using the at least one security key; and
   update the cryptosync value when succeeding in performing an integrity operation using the at least one security key.

* * * * *

UNITED STATES PATENT AND TRADEMARK OFFICE
CERTIFICATE OF CORRECTION

PATENT NO. : 10,567,964 B2
APPLICATION NO. : 15/358345
DATED : February 18, 2020
INVENTOR(S) : Tenny et al.

Page 1 of 1

It is certified that error appears in the above-identified patent and that said Letters Patent is hereby corrected as shown below:

In the Claims

In Column 21, Lines 9-10, in Claim 6, delete "comprising;" and insert --comprising:-- therefor Signed and Sealed this
Ninth Day of June, 2020

Andrei Iancu
*Director of the United States Patent and Trademark Office*